(12) United States Patent
Smick et al.

(10) Patent No.: US 8,558,486 B2
(45) Date of Patent: Oct. 15, 2013

(54) D. C. CHARGED PARTICLE ACCELERATOR, A METHOD OF ACCELERATING CHARGED PARTICLES USING D. C. VOLTAGES AND A HIGH VOLTAGE POWER SUPPLY APPARATUS FOR USE THEREWITH

(75) Inventors: Theodore H. Smick, Essex, MA (US); Geoffrey Ryding, Manchester, MA (US); William H. Park, Somerville, MA (US); Ronald Horner, Auburndale, MA (US)

(73) Assignee: GTAT Corporation, Nashua, NH (US)

( * ) Notice: Subject to any disclaimer, the term of this patent is extended or adjusted under 35 U.S.C. 154(b) by 324 days.

(21) Appl. No.: 12/962,723

(22) Filed: Dec. 8, 2010

(65) Prior Publication Data

US 2012/0146554 A1 Jun. 14, 2012

(51) Int. Cl.
  *H05H 7/22* (2006.01)
  *H02K 16/00* (2006.01)
(52) U.S. Cl.
  USPC .............. 315/505; 310/12.15; 310/49.37; 310/112; 250/492.1; 250/492.2; 250/492.21; 315/506
(58) Field of Classification Search
  USPC ............... 315/505; 250/492.1, 492.2, 492.21; 310/112
  See application file for complete search history.

(56) References Cited

U.S. PATENT DOCUMENTS

| | | | |
|---|---|---|---|
| 3,484,866 A | 12/1969 | Nakamura et al. | |
| 4,383,180 A * | 5/1983 | Turner | 250/492.2 |
| 5,124,658 A * | 6/1992 | Adler | 315/500 |
| 5,325,284 A | 6/1994 | Stephenson | |
| 6,653,642 B2 * | 11/2003 | Pedersen et al. | 250/492.21 |
| 2005/0200320 A1 | 9/2005 | Korenev | |
| 2009/0224701 A1 | 9/2009 | Morita et al. | |
| 2010/0033115 A1 | 2/2010 | Cleland et al. | |
| 2010/0301985 A1 | 12/2010 | Luo et al. | |

OTHER PUBLICATIONS

Weisser, D. "Voltage Distribution Systems—Resistors and Corona Points." Electrostatic Accelerators: Fundamentals and Applications. The Netherlands: Springer, 2005. p. 110-22.
U.S. Appl. No. 12/494,269, filed Jun. 30, 2009, entitled "Ion Implantation Apparatus".
International Search Report and Written Opinion dated Jul. 9, 2012 for PCT Application No. PCT/US2011/062531.
Office Action dated May 8, 2013 for U.S. Appl. No. 13/186,513.

* cited by examiner

*Primary Examiner* — Jerome Jackson, Jr.
*Assistant Examiner* — David Lotter
(74) *Attorney, Agent, or Firm* — The Mueller Law Office, P.C.

(57) ABSTRACT

A d.c. charged particle accelerator comprises accelerator electrodes separated by insulating spacers defining acceleration gaps between adjacent pairs of electrodes. Individually regulated gap voltages are applied across each adjacent pair of accelerator electrodes. In embodiments, the individually regulated gap voltages are generated by electrically isolated alternators mounted on a common rotor shaft driven by an electric motor. Alternating power outputs from the alternators provide inputs to individual regulated d.c. power supplies to generate the gap voltages. The power supplies are electrically isolated and have outputs connected in series across successive pairs of accelerator electrodes. The described embodiment enables an ion beam to be accelerated to high energies and high beam currents, with good accelerator stability.

19 Claims, 22 Drawing Sheets

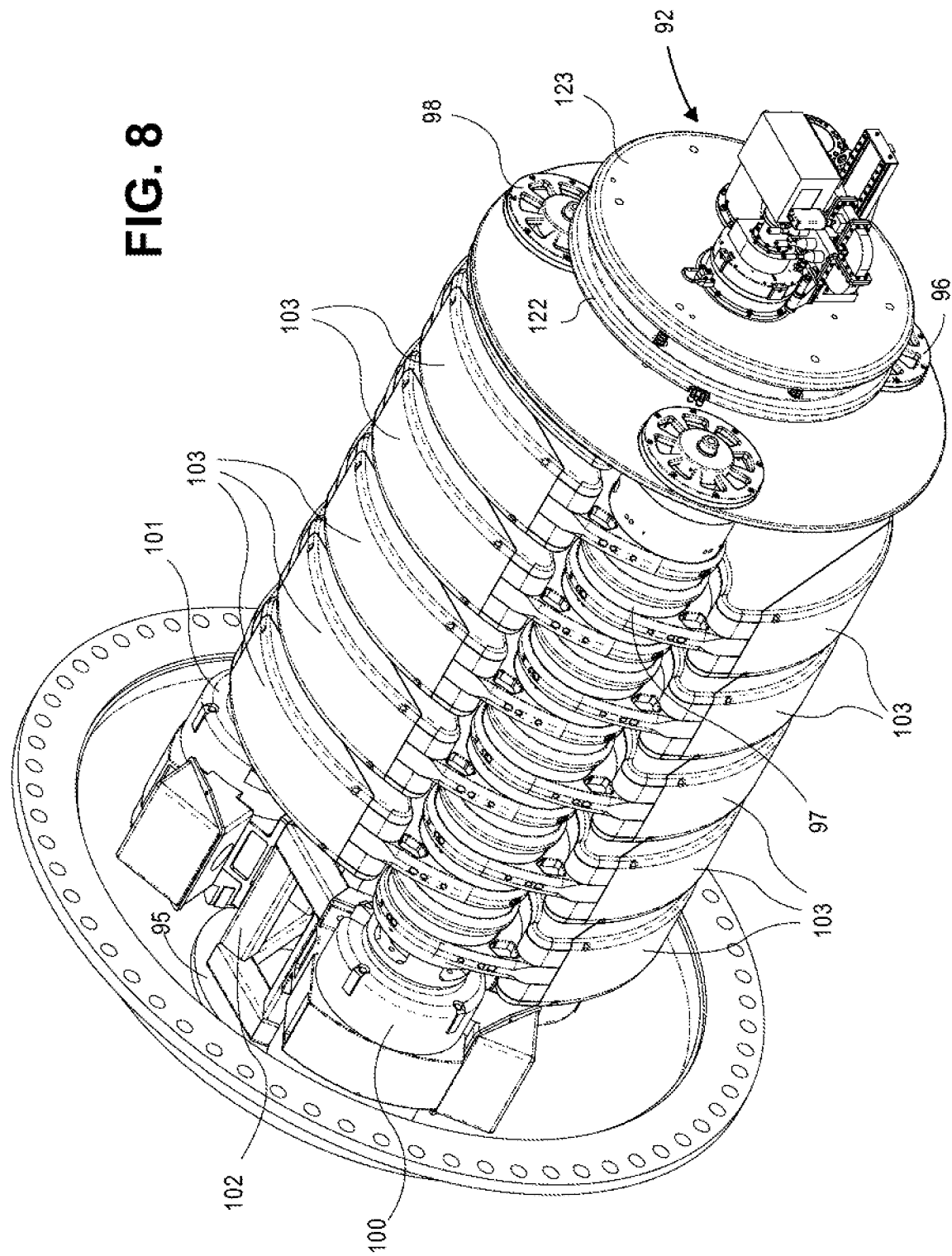

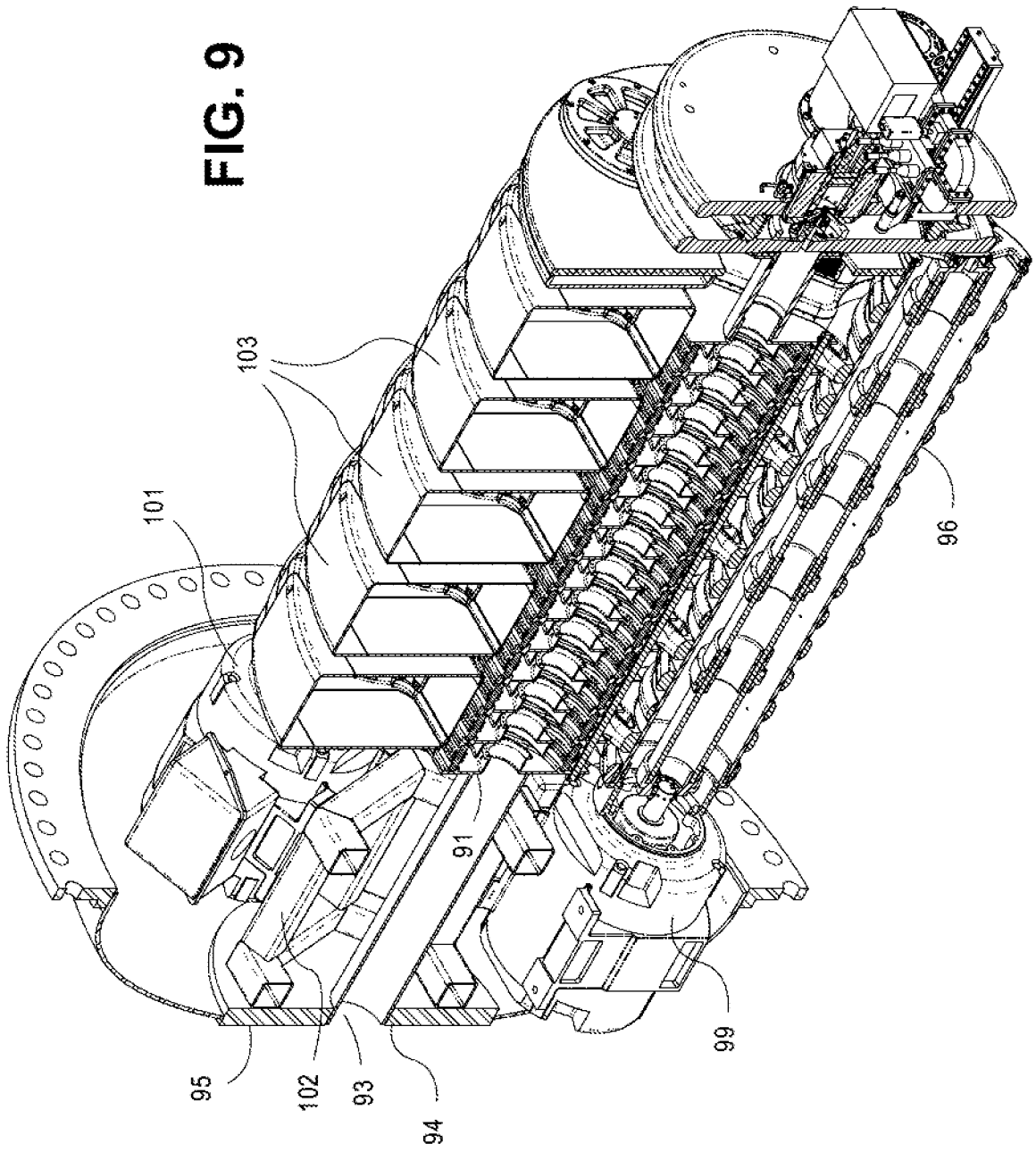

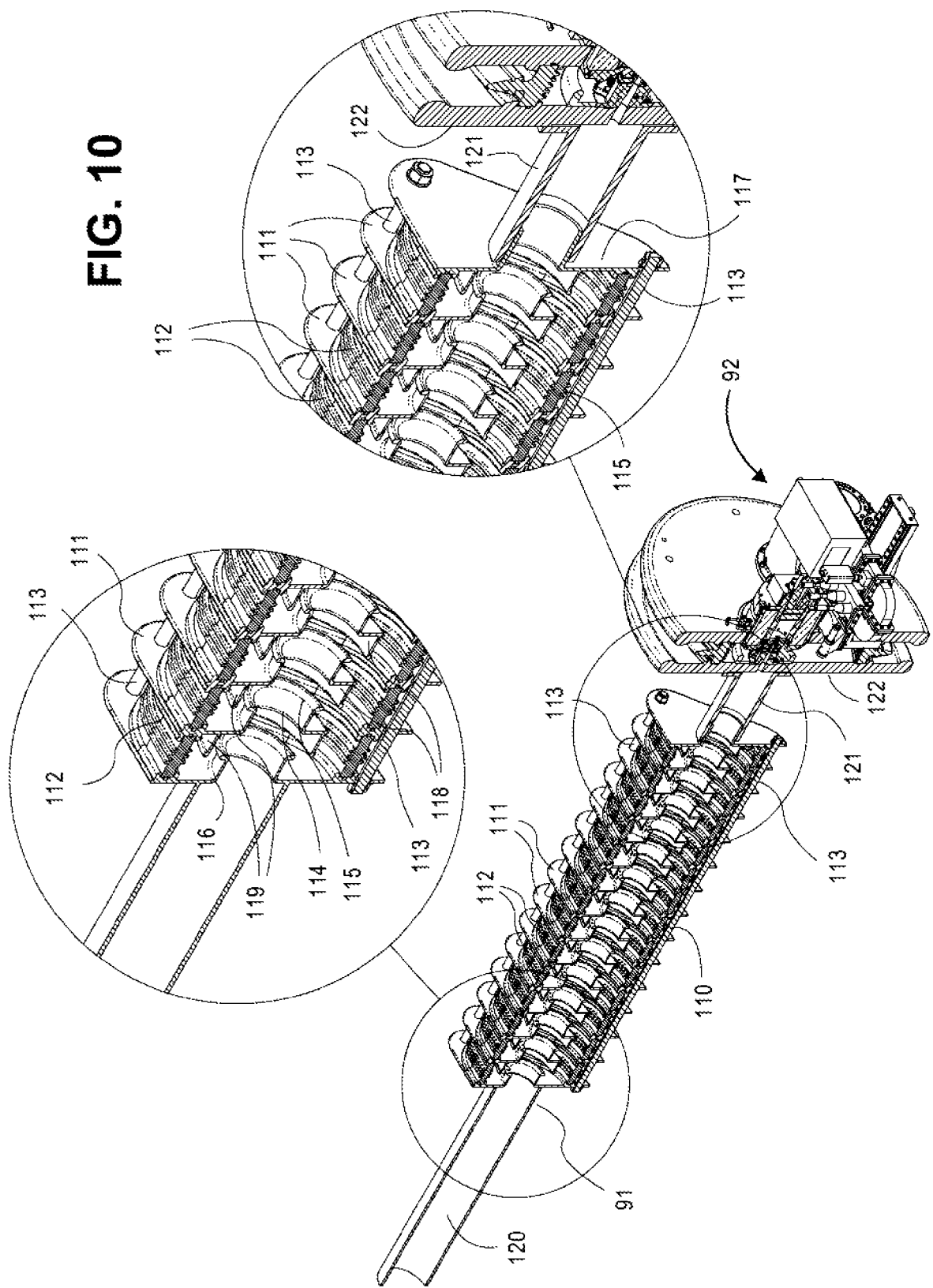

US 8,558,486 B2

D. C. CHARGED PARTICLE ACCELERATOR, A METHOD OF ACCELERATING CHARGED PARTICLES USING D. C. VOLTAGES AND A HIGH VOLTAGE POWER SUPPLY APPARATUS FOR USE THEREWITH

BACKGROUND

1. Field of the Invention

This invention relates to a d.c. charged particle accelerator and a method of accelerating charged particles using d.c. voltages. The invention also relates to a high voltage power supply apparatus which may be used in the accelerator and method. The invention is directed to an accelerator and method for accelerating positive ions in ion implantation apparatus.

2. Background Information

Ion implantation may require the production of ion beams at high energies and high beam current. D.c. accelerators are known to be used in ion implanters for providing the required beam energy.

In a known charged particle accelerator, a number of accelerator electrodes define successive acceleration gaps. The accelerator electrodes are biased at regular voltage intervals to control the voltage gradient along the length of the accelerator. Bias voltages for the accelerator electrodes are derived from a potential divider connected to a high voltage generator providing the full accelerator potential, which may for example be several hundred kilovolts or in excess of one megavolt.

BRIEF SUMMARY OF THE INVENTION

In one aspect, the invention provides a d.c. charged particle accelerator comprising acceleration electrodes including end electrodes and at least N-1 intermediate electrodes. The acceleration electrodes define at least N acceleration gaps between adjacent pairs of said electrodes, where N is at least 3. Regulated d.c. high voltage power supply apparatus has N pairs of output lines connected to respective adjacent pairs of said accelerator electrodes defining said N acceleration gaps. The power supply apparatus is operative to provide N regulated high voltage d.c. output voltages, which are electrically isolated from each other, on said N pairs of output lines to provide gap voltages across said N acceleration gaps. Said N regulated output voltages may have a common value $V_{gap}$.

In an embodiment, said regulated d.c. high voltage power supply apparatus comprises N d.c. voltage generators, which are d.c. isolated from each other, each of said voltage generators having at least one of said N pairs of output lines and being arranged to generate a respective one of said N regulated high voltage d.c. output voltages from input electric power delivered to said voltage generator. A d.c. isolating power delivery apparatus is arranged to deliver said input electric power to said N voltage generators while maintaining d.c. isolation between said voltage generators. The N d.c. voltage generators may comprise N d.c. high voltage power supply units providing said regulated high voltage d.c. outputs from unregulated input electric power.

In an embodiment, said d.c. isolating power delivery apparatus comprises N alternators to deliver a.c. power as said unregulated input electric power to respective said d.c. high voltage power supply units. Each said alternator may comprise a stator having at least one stator winding and a rotor carrying at least one rotor magnet to produce a rotating magnetic field in said stator to induce alternating currents in said stator winding to provide said a.c. power. Then said stators of at least two of said alternators may be axially aligned, and said d.c. isolating power delivery apparatus comprises at least one common rotor shaft carrying, axially spaced along said shaft, said rotors of said at least two alternators, and a motor connected to rotate said common rotor shaft.

In embodiments, said common rotor shaft provides electrical isolation of each said rotors carried by said rotor shaft. In particular, said common shaft may be formed of electrically insulating material.

The d.c. isolating power delivery apparatus may comprise a stator tube carrying, axially spaced along said stator tube, said stators which are axially aligned. Said common rotor shaft is then mounted for rotation within said stator tube.

In embodiments, said stator tube provides electrical isolation of each of said stators carried by said stator tube. In particular said stator tube may be formed of electrically insulating material.

The d.c. accelerator may be a linear accelerator having an elongate accelerator tube containing said accelerator electrodes, defining a linear acceleration path for charged particles through said accelerator. Then said at least one common rotor shaft may be mounted alongside said accelerator tube and aligned parallel to said acceleration path.

In an embodiment, said alternators are arranged in three groups, said stators of said alternators in each group being axially aligned. Said d.c. isolating power delivery apparatus then comprises one said common rotor shaft for each group of alternators, and said three common rotor shafts, which are aligned parallel to said acceleration paths, are located symmetrically about said accelerator tube.

In a further aspect, the invention provides high voltage power supply apparatus comprising at least two alternators having respective outputs to produce a.c. power at said outputs. Each said alternator comprises a respective stator having at least one stator winding and a respective rotor carrying at least one rotor magnet to produce a rotary magnetic field in said stator to induce alternating currents in said stator winding to provide said a.c. power. The stators of said alternators are axially aligned and the apparatus comprises a common rotor shaft carrying, axially spaced along said shaft, said rotors of said alternators. A motor is connected to rotate said common shaft so that each of said alternators generates a.c. power at its respective output. The apparatus further includes a respective d.c. high voltage power supply unit connected to receive said a.c. power from the output of each said alternator, each said power supply having a respective pair of output terminals and being operative to convert said a.c. power to produce a regulated high voltage output voltage at said respective pair of output terminals. The common rotor shaft provides electrical isolation of said rotors carried by the rotor shaft. The output terminals of the power supplies may be connected in series.

The invention further provides a method of accelerating charged particles using d.c. voltages. In the method, acceleration electrodes are provided including end electrodes and at least N-1 intermediate electrodes. The acceleration electrodes define at least N acceleration gaps between adjacent pairs of said electrodes, where N is at least 3. N regulated high voltage d.c. output voltages are produced which are electrically isolated from each other. The N regulated output voltages are applied to the acceleration electrodes defining said N acceleration gaps to provide gap voltages.

BRIEF DESCRIPTION OF THE DRAWINGS

Examples of the invention will now be described with reference to the accompanying drawings, in which:

FIG. 8 is an isometric perspective view of the d.c. charged particle accelerator of FIG. 6, with the shell of the containment vessel removed;

FIG. 9 is a sectional isometric view of the d.c. charged particle accelerator of FIG. 8;

FIG. 10 is a sectional isometric view of the accelerator tube of the d.c. charged particle accelerator of FIGS. 6-9, with portions enlarged for clarity;

DETAILED DESCRIPTION OF THE INVENTION

The present invention provides a d.c. particle accelerator which can operate at relatively high energies and also maintain good stability at high beam currents.

Figure 1:
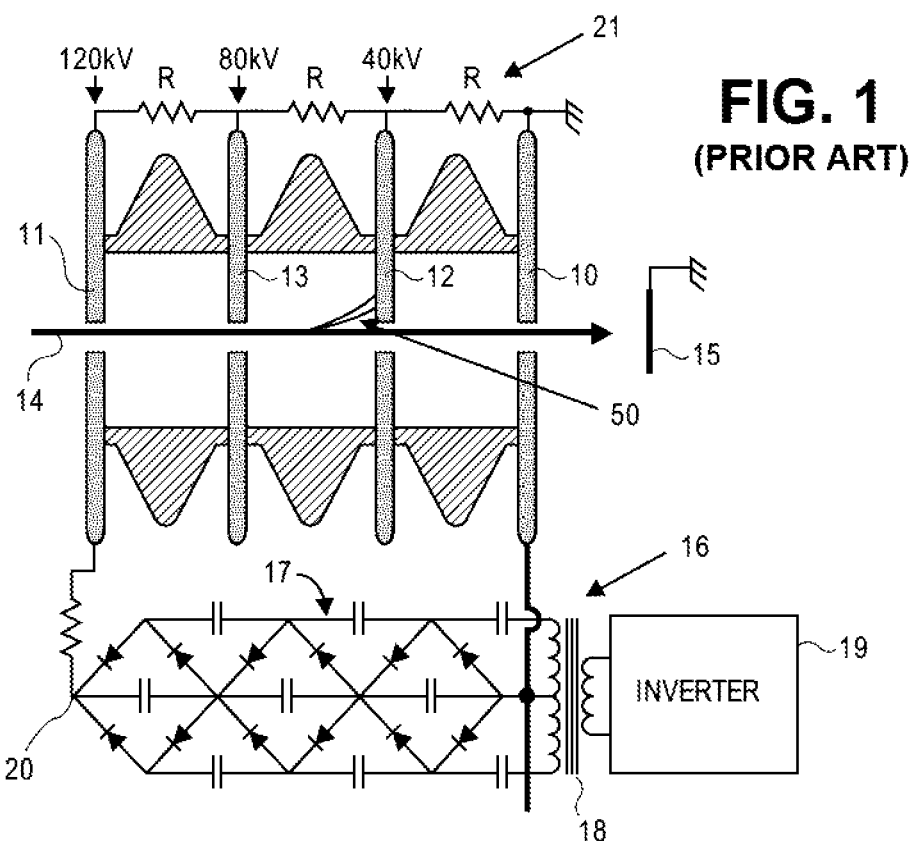
FIG. 1 is a schematic representation of a prior art d.c. charged particle accelerator.

FIG. 1 is a schematic illustration of a typical prior art d.c. charged particle accelerator having just three acceleration gaps defined by end electrodes 10 and 11 and two intermediate electrodes 12 and 13. The electrodes 10, 11, 12 and 13 typically comprise apertured plates with the apertures in the plates aligned along a central axis, defined in the drawing by the line 14.

The end electrode 10, which is the right hand electrode in the drawing, may be held at ground potential, and increasing positive voltages applied to electrodes 12, 13 and 11 respectively. In a typical arrangement, these increasing positive voltages would define a common voltage drop ($V_{gap}$) across acceleration gaps between the adjacent pairs of electrodes. In the illustrated example, the common gap voltage $V_{gap}$ is 40 kV, so that the total voltage drop from the left hand end electrode 11 to the ground electrode 10 is 120 kV. Then positive charged particles or ions in a beam directed along the axis 14 from left to right in FIG. 1 will be accelerated by 120 keV when the beam emerges through the aperture in the ground electrode 10. The beam of accelerated positive ions may then be directed at a target 15. When the accelerated ion beam is used for ion implantation in semiconductor manufacturing processes, the target 15 may be a target of semiconductor material. Accelerated ion beams are also used for processing semiconductor wafers in order to enable thin laminae of silicon to be exfoliated from the surface of the wafer being processed. Apparatus for implanting high energy $H^+$ ions (protons) into silicon wafer substrates to provide exfoliated silicon laminae for use in the manufacture of solar cells, is disclosed in U.S. patent application Ser. No. 12/494,269 to Ryding et. al. (attorney docket no. TwinP030/TCA-023y), which is assigned to the assignee of the present invention. The disclosure of this US patent application is incorporated herein by reference in its entirety for all purposes.

In accordance with the prior art arrangement shown in FIG. 1, the required electrode voltages, here 40 kV, 80 kV and 120 kV, are applied by a high voltage (h. v.) power supply unit indicated generally at 16. The power supply unit 16 is formed of a Cockroft Walton (CW) voltage multiplying circuit 17 powered by a transformer 18 from a high frequency inverter 19. The CW multiplier is formed of repeated stages of capacitors and full wave rectifier bridges, and the operation of this CW circuit is well understood by those skilled in the art.

As illustrated in the Figure, the transformer 18 has a secondary winding with a center tap connected to ground (here via grounded end electrode 10). If the alternating voltage across each half of the secondary winding of the transformer winding 18 has a peak amplitude A, then the CW multiplier 17 which comprises three full wave rectifiers and associated capacitors, produces a d.c. output voltage at point 20 of 3×2 A. In the present example, the inverter 19 and the transformer 18 produce an output from each half of the secondary winding having a peak amplitude A=20 kV, so that the d.c. voltage generated at point 20 is 120 kV. In order to keep the reactive components of the CW multiplier 17 and also the transformer 18 as small as possible, the inverter 19 is arranged to drive the transformer primary at a frequency of several KHz, typically 30 KHz.

In accordance with standard practice for this prior art d.c. charged particle accelerator, the output of the CW multiplier 17 is connected to the end electrode of the accelerator at the highest potential relative to ground, here left hand end electrode 11. A connection from point 20 to the electrode 11 is made via a resistance of a few kilohms, in order to provide some over current protection to the multiplier 17.

In order to provide the appropriate voltages at intermediate electrodes 12 and 13, high value resistances R are connected in series between successive electrodes to provide a potential divider illustrated generally at 21. To minimize current drain through the potential divider formed by the series connected resistors R, these resistors have a high resistance value, typically some tens of megohms. This is theoretically quite satisfactory as there should be negligible current flow to or from the intermediate electrodes 12 and 13.

Figure 2:
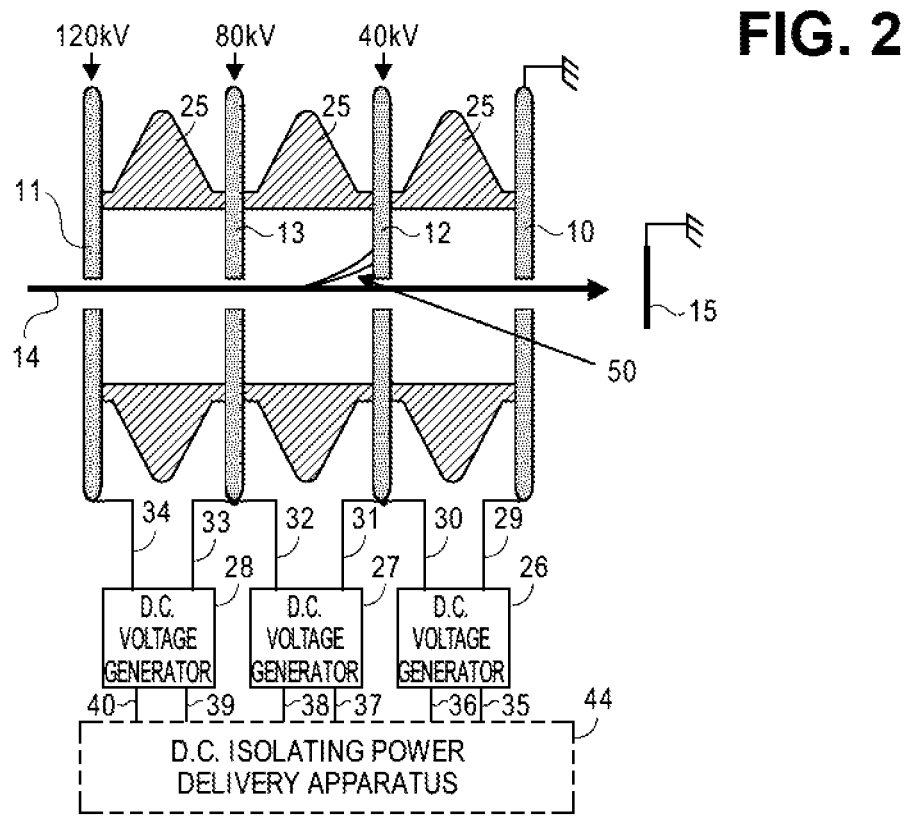
FIG. 2 is a schematic representation of a d.c. charged particle accelerator embodying the present invention.

FIG. 2 illustrates a d.c. charged particle accelerator which embodies the present invention. Elements of the construction illustrated in FIG. 2 which correspond to elements in the prior art arrangement of FIG. 1 are given the same reference numerals. Accordingly, the accelerator comprises end electrodes 10 and 11 together with intermediate electrodes 12 and 13 defining between them three acceleration gaps between adjacent pairs of electrodes. The electrodes are separated by insulating spacers, identified by reference numeral 25 in FIG. 2. A beam of charged particles is accelerated along the axis 14 to strike a target 15.

In the embodiment of FIG. 2, gap voltages are applied across successive adjacent pairs of the electrodes 10, 11, 12 and 13 by three d.c. voltage generators 26, 27 and 28. These d.c. voltage generators 26, 27 and 28 are electrically isolated from each other and each has a pair of output lines 29 and 30, 31 and 32, and 33 and 34. The output lines are connected to respective adjacent pairs of the accelerator electrodes defining the three acceleration gaps, so that output lines 29 and 30 from generator 26 are connected to ground electrode 10 and the first intermediate electrode 12, output lines 31 and 32 from generator 27 are connected to intermediate electrodes 12 and 13, and output lines 33 and 34 of generator 28 are connected to intermediate electrode 13 and the high voltage end electrode 11.

Each of the d.c. voltage generators 26, 27 and 28 also has respective input lines 35 and 36, 37 and 38 and 39 and 40. Input electric power is delivered to the voltage generators along these input lines from a d.c. isolating power delivery apparatus 44. The d.c. isolating power apparatus 44 is arranged to deliver the required input electric power to the d.c. voltage generators 26, 27 and 28 while maintaining d.c. isolation between these voltage generators.

The d.c. isolating power delivery apparatus 44 may be embodied in various ways. In one example, an external, ground referenced, a.c. power source is connected to a first isolating transformer providing an isolated a.c. source for delivery of input electric power on lines 35 and 36 to d.c. voltage generator 26. The isolated a.c. power from the secondary winding of this first isolating transformer is connected to the primary winding of a second isolating transformer and the a.c. power from the secondary winding of the second isolating transformer is then used to provide input electric power on input lines 37 and 38 to generator 27. Similarly, the a.c. electric power from the secondary winding of the second isolating transformer is fed to the primary winding of a third isolating transformer. The a.c. power from the secondary winding of the third isolating transformer is then used to supply input electric power on input lines 39, 40 of generator 28.

In this way, the required input electric power is supplied to each of the voltage generators 26, 27 and 28, without compromising the d.c. isolation of these voltage generators. Then, the output lines of the d.c. voltage generators can be connected as shown to the accelerator electrodes whereby the output lines of the generators are effectively connected in series. In this way, the required gap voltages are applied across the successive acceleration gaps of the accelerator.

The d.c. voltage generators 26, 27 and 28, together with the d.c. isolating power delivery apparatus 44 together operate so that the output voltages on the output lines of the d.c. voltage generators are all regulated voltages, providing respective defined gap voltages between the successive gaps of the accelerator. It can be seen, therefore, that the generators 26, 27 and 28 in combination with the d.c. isolating power delivery apparatus 44 provide a regulated d.c. high power voltage supply apparatus which has three pairs of output lines connected to respective adjacent pairs of the accelerator electrodes defining the three acceleration gaps. The regulated power supply apparatus is operative to provide three regulated high voltage d.c. output voltages which are electrically isolated from each other on the three pairs of output lines from the generators, to provide the required gap voltages across the three acceleration gaps.

Whereas the accelerators in FIGS. 1 and 2 are shown with just three acceleration gaps and are defined by end electrodes and two intermediate electrodes, the particle accelerator of the embodiments of the invention described with reference to FIG. 2 may be formed with more than three acceleration gaps, when required to provide an accelerated charged particle beam of higher energy.

It is normal in the design of d.c. charged particle accelerators for the successive acceleration gaps of the accelerator to have a uniform gap size, and for the applied gap voltage to be the same across each gap. However, this is not strictly essential and different gap sizes may be used in some circumstances, and/or differing regulated gap voltages may be applied across the various acceleration gaps.

By providing regulated output voltages from the generators 26, 27 and 28, across each of the three acceleration gaps illustrated in FIG. 2, the performance of the charged particle accelerator can be substantially enhanced.

Referring back to the prior art arrangement of FIG. 1, the voltage divider 21 providing gap voltages to the intermediate electrodes 12 and 13 is quite satisfactory in the absence of any current loading of the intermediate electrodes. However, in practice when the accelerator is used to accelerate an ion beam along the axis 14, some ions (charged particles) in the beam may strike one of the intermediate electrodes. Beam strike 50 on intermediate electrode 12 is illustrated in FIG. 1.

In the illustrated example of the prior art, the accelerator is used to accelerate a beam of positive ions, so that a beam strike onto electrode 12 causes positive current to flow from electrode 12 into the potential divider 21. Because of the relatively high value of the resistors R in the potential divider 21, a relatively small current resulting from beam strike 50 can have a very substantial effect on the voltage across the resistors R, and hence cause a substantial disturbance of the gap voltages in the accelerator.

In an example, the intended gap voltage across each of the accelerator gaps may be 40 kV and the value R of the resistors of the potential divider 21 may be 40 Mohm. In the absence of any beam strike current flowing in intermediate electrodes 12 and 13, the current flowing through the series connected resistors R of the potential divider 21 is 1mA. If the ion beam along axis 14 is a high power beam of say 50 mA, a beam strike 50 of just 2% of this beam current can produce current of 1 mA flowing into the potential divider 21 from the electrode 12. Clearly this beam strike current has a very substantial effect on the voltages across each of the resistors of the potential divider 21. In fact, the voltage across the acceleration gap defined by electrodes 10 and 12 would increase by over 65%. In a practical accelerator in which gap voltages are set as high as possible within the limits of the spacings and insulation between electrodes, an increase in gap voltage of this magnitude would very likely cause a breakdown or arcing between adjacent electrodes, so that the stability of the accelerator is compromised.

This tendency to instability in d.c. accelerators is aggravated for relatively high powered beams and for accelerators with large numbers of acceleration gaps, and frequently is a limiting factor for the beam current which can be passed through the accelerator.

The arrangement of the embodiments of the invention shown in FIG. 2 substantially alleviates the problem of the prior art, because the gap voltage across each of the illustrated acceleration gaps is provided as a regulated voltage. Then, a beam strike current into one of the intermediate electrodes 12, 13, can be absorbed by the regulated power supply apparatus with a much reduced effect on the d.c. output voltages from the voltage generators 26, 27 and 28. As a result, the accelerator of the embodiment of FIG. 2 can have substantially greater stability and consequently can be operated at higher beam powers.

The voltage regulation of the output voltages of the embodiment of FIG. 2 may be conducted either in the d.c. isolating power delivery apparatus 44, or in each of the d.c. voltage generators 26, 27 and 28. For example, the d.c. isolating power delivery apparatus 44 may provide input electric power on each of the pairs of input lines 35, 36, 37, 38 and 39, 40 which is voltage regulated, in which case the d.c. voltage generators 26, 27 and 28 are required only to generate the required d.c. output voltage corresponding to the required gap voltages in direct proportion to the regulated input voltages.

Figure 3:
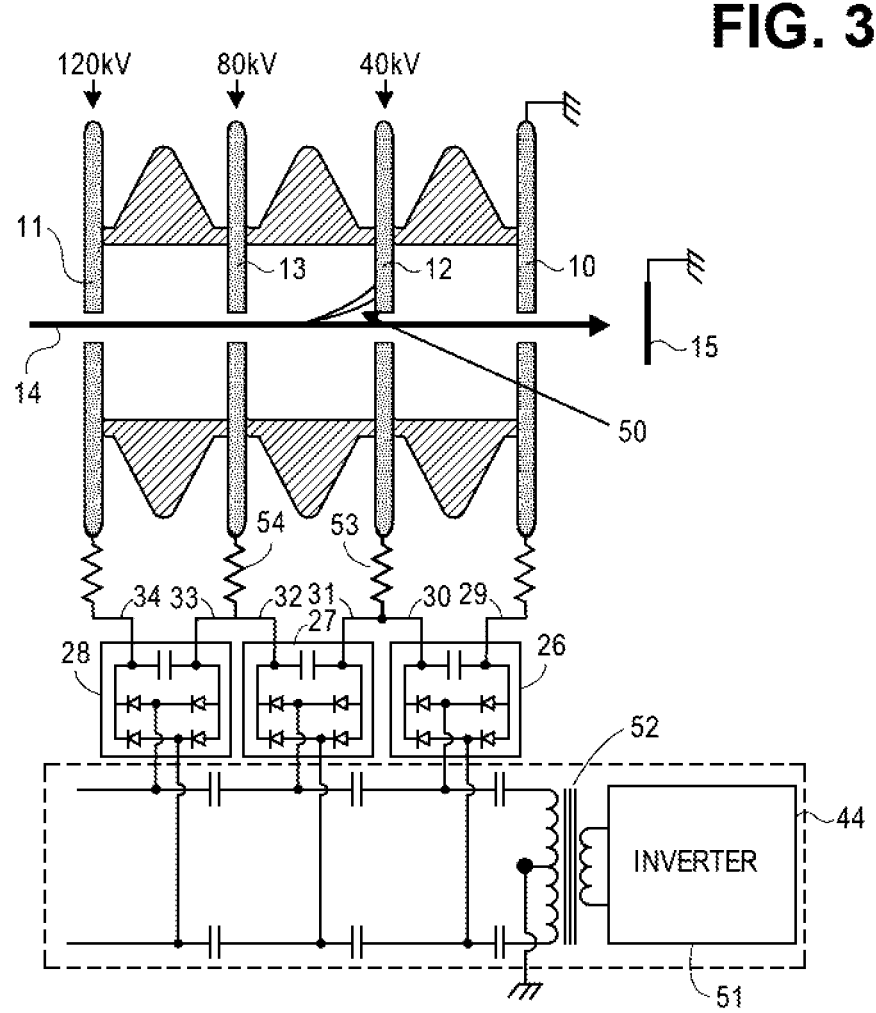
FIG. 3 is a schematic representation of a first embodiment of d.c. charged particle accelerator in accordance with the present invention.
Figure 4:
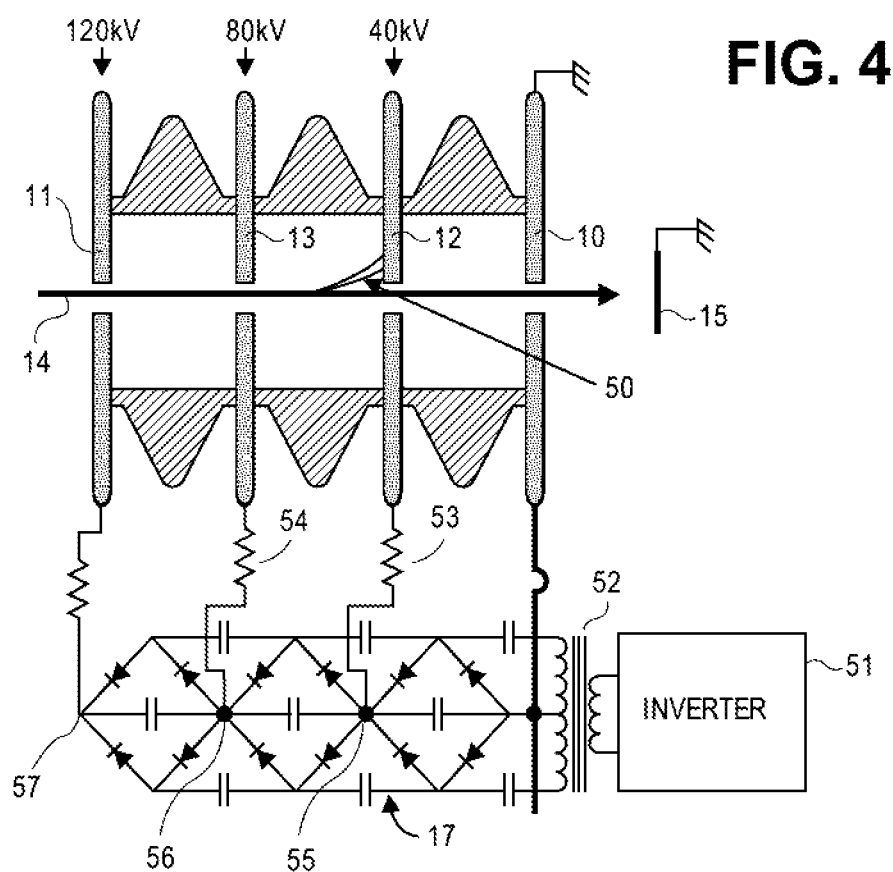
FIG. 4 is a schematic representation of the d.c. charged particle accelerator of FIG. 3, showing the power supply circuitry in alternative form.

An example of an arrangement where the voltage regulation is effectively performed in the d.c. isolating power delivery apparatus 44 is shown in FIGS. 3 and 4. In the embodiment of FIG. 3, the d.c. isolating power delivery apparatus 44 comprises an inverter 51, which may be fed from a ground referenced mains supply. Inverter 51 produces a high frequency a.c. supply driving the primary winding of a step up transformer 52. The peak amplitude voltage of the high frequency supply from the inverter 51 is regulated by the inverter to a constant value, so that the peak to peak voltage across the secondary winding of the step up transformer 52 is also maintained at a constant value. In the present embodiment where the desired gap voltage is 40 kV, the inverter 51 is arranged to provide a regulated high frequency output which, after stepping up by the transformer 52, produces a peak to peak voltage of 40 kV in each half of the center tapped secondary winding of the step up transformer 52.

The regulated d.c. high voltage power supply apparatus shown in FIG. 3 is the same as that illustrated in FIG. 4, except that, in FIG. 4, the elements of the d.c. isolating power delivery apparatus 44, and the d.c. voltage generators 26, 27 and 28 are redrawn to represent the more familiar CW voltage multiplier circuit. In fact, the circuit illustrated in FIG. 4 differs from the prior art arrangement of FIG. 1 only in that connections are taken from each stage of the CW multiplier directly (via resistances 53 and 54), to the intermediate electrodes 12 and 13 of the accelerator. The CW multiplier illustrated in FIG. 4 produces a d.c. voltage at a first stage point 55 which is equal to the peak to peak voltage on each half of the center tap secondary winding of the step up transformer 52. Since the voltage on the secondary winding of the step up transformer 52 is effectively regulated by the inverter 51, the d.c. voltage at a first stage point 55 in the CW multiplier is effectively a regulated d.c. voltage. Similarly, the voltage at the second stage point 56 in the CW multiplier is maintained at a regulated d. c. voltage equal to twice the peak to peak voltage of each half of the center tap secondary winding of the step up transformer 52. The d.c. voltage at the third stage point 57 of the CW multiplier is maintained at a regulated d.c. voltage equal to three times the peak to peak voltage from each half of the secondary winding of the step up transformer 52. In this way d.c. regulated voltages are provided at the appropriate voltage from each of the stage points 55, 56 and 57 for connection to electrodes 12, 13 and 14, so that the required gap voltages are provided.

To provide over current protection, the intermediate CW stage points 55 and 56 are connected to the respective intermediate electrodes 12 and 13 via current limiting resistors 53 and 54. However, the value of the current limiting resistors 53 and 54 may be much lower than the resistors of the potential divider 21 in the prior art arrangement, as these resistors should not be dissipating any electrical power in the absence of a beam strike on the electrodes. Accordingly resistance values for the resistors 53 and 54 of the order of 100 k ohm may be employed. Then a 1 mA current from intermediate electrode 12 resulting from beam strike 50 flowing through resistor 53 produces a voltage change on the electrode 12 of just 100V. Even the entire beam current (50 mA) striking electrode 12 and flowing through resistor 53 would produce a voltage change of 5 kV, compared to the nominal gap voltage of 40 kV for the accelerator. Accordingly, the embodiment described in FIGS. 3 and 4 can be much more resistant to the effect of beam strikes and therefore be operated at higher beam powers without excessive instability.

Figure 5:
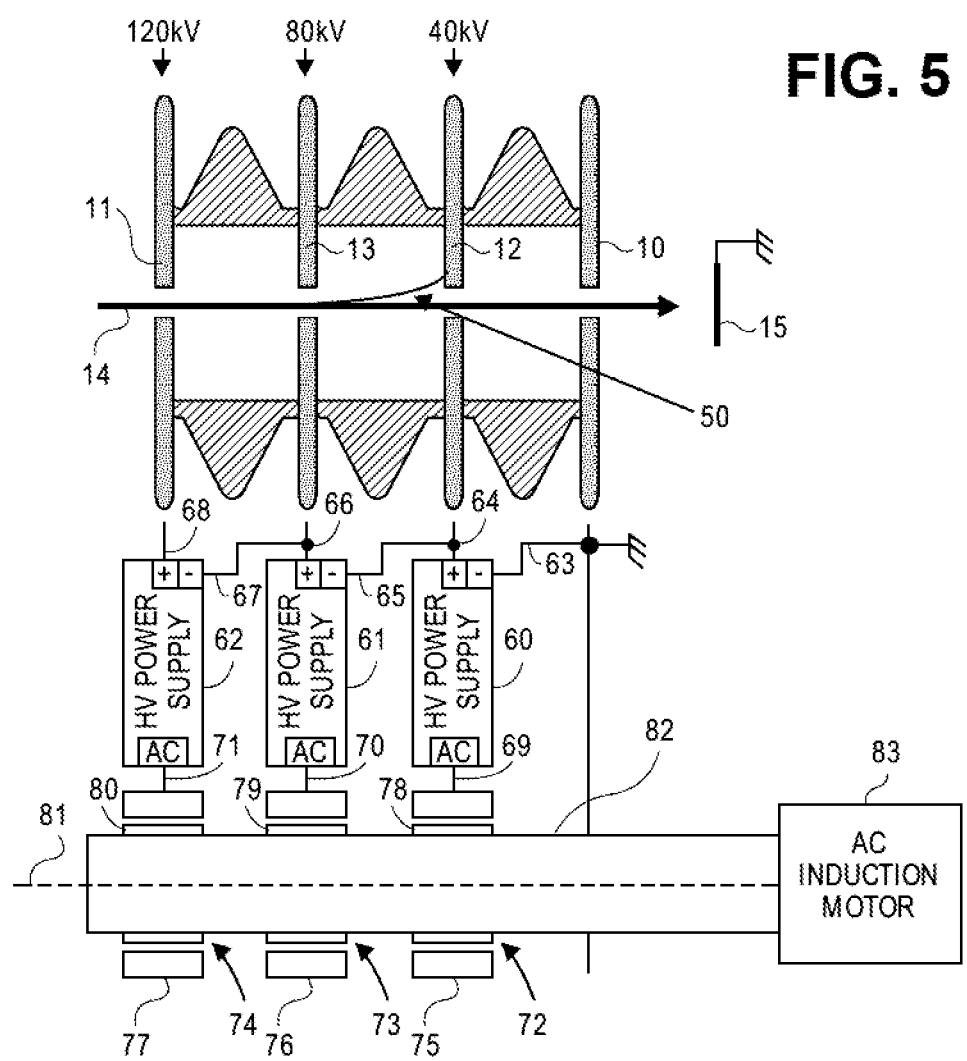
FIG. 5 is a schematic representation of a second embodiment of d.c. charged particle accelerator in accordance with the present invention.

FIG. 5 illustrates schematically a further embodiment of the invention in which the d.c. voltage generators of the FIG. 2 embodiment are formed as d.c. high voltage power supply units indicated in FIGS. 5 at 60, 61 and 62. Tthe high voltage power supply units 60, 61 and 62 have respective output lines 63, 64, 65, 66 and 67, 68 which are connected to respective adjacent pairs of the accelerator electrodes 10, 12, 13 and 11. In this embodiment, each of the high voltage power supply units 60, 61 and 62 provides a regulated high voltage d.c. output on its respective output lines, derived from unregulated a.c. inputs on input lines 69, 70, 71 respectively. The input lines 69, 70 and 71 are shown in the drawing for simplicity as a single line. As the a.c. input power on lines 69, 70 and 71 is in each case unregulated, the regulation for the output voltages on output lines 63, 64, 65, 66 and 67, 68 is performed by the respective high voltage power supply units 60, 61 and 62.

The a.c. input power on lines 69, 70 and 71 is generated by respective alternators shown schematically at 72, 73 and 74. Each of the alternators 72, 73 and 74 has a respective stator 75, 76 and 77 which contains at least one stator winding. Each of the alternators also has a rotor carrying at least one rotor magnet 78, 79, 80, so that rotation of the rotor within the stator of the alternator produces a rotating magnetic field in the stator to induce alternating current in a stator winding to provide the required a.c. input power on input lines 69, 70 and 71.

In the embodiment, the stators 75, 76 and 77 are all axially aligned on a common axis 81. Also, the rotors 78, 79, 80 of the alternators are mounted on a common rotor shaft 82. The rotors 78, 79, 80 are axially spaced apart along the shaft 82. The stators 75, 76 and 77 are electrically isolated from each other, and the common rotor shaft 82 is formed of electrically insulating material, such as fiberglass, in order to provide electrical isolation of the rotors from each other. To power the alternators 72, 73 and 74, the common rotor shaft 82 is driven by an a.c. induction motor 83 which may itself receive ground referenced mains electrical power.

In this way, a single motor 83 is used to drive the three alternators 72, 73 and 74 and the alternators themselves are electrically isolated from each other, so that their a. c. output voltages on lines 69, 70 and 71 can be delivered to the respective high voltage power supply units 60, 61 and 62. As the output lines of the h. v. power supply unit 60, 61 and 62 are connected across successive adjacent pairs of the electrodes of the accelerator, the power supply units are effectively connected in series.

A combination of power supply units 60, 61 and 62, alternators 72, 73 and 74 on common drive shaft 82, driven by motor 83, provides a regulated d.c. high voltage power supply apparatus. The three pairs of output lines 63 and 64, 65 and 66, and 67 and 68 of the apparatus are connected to respective adjacent pairs of the accelerator electrodes, here 10 and 12, 12 and 13, and 13 and 11 respectively. The apparatus thereby provides three regulated high voltage d.c. output voltages to generate the gap voltages across the electrodes. With this arrangement, each of the d.c. high voltage power supply units 60, 61 and 62 has to provide a regulated d.c. output voltage only at the accelerator gap voltage, shown as 40 kV in the example of FIG. 5. Higher gap voltages may also be contemplated, for example 70 kV or higher. Each of the high voltage power supply units 60, 61 and 62 also has to provide sufficient output current to drive the required beam current, which in a high power beam embodiment may be 50 mA or more. Nevertheless, since each of the high voltage power supply units is producing an output voltage corresponding only to the gap voltage, the cost of providing the required three high voltage power supply units 60, 61 and 62 may be significantly less than the cost of providing a single high voltage power supply unit producing the required 50 mA or more current and an output voltage corresponding to the full accelerator potential, for example 120 kV in the three gap example shown in FIG. 5.

In practice, the d.c. accelerator may have multiple gaps providing an overall acceleration energy of many hundreds of kilovolts, or in excess of one megavolt. Then the provision of one relatively low voltage power supply, corresponding to supply 60, 61 and 62, for each acceleration gap, may be much cheaper than a single power supply unit for the full acceleration potential. Importantly also, the power available from using individual power supply units for each acceleration gap can be much greater (at an equivalent cost) compared to using a single power supply unit for the full acceleration potential. It is well understood to those skilled in this art that there are limits to the number of stages that can be added to a CW multiplier, before the available power is severely curtailed.

At the same time, the embodiment of FIG. 5 has the advantage of providing a regulated gap voltage across each of the accelerator gaps, so that the accelerator can be much more stable than prior art arrangements using a potential divider as illustrated in FIG. 1.

Figure 6:
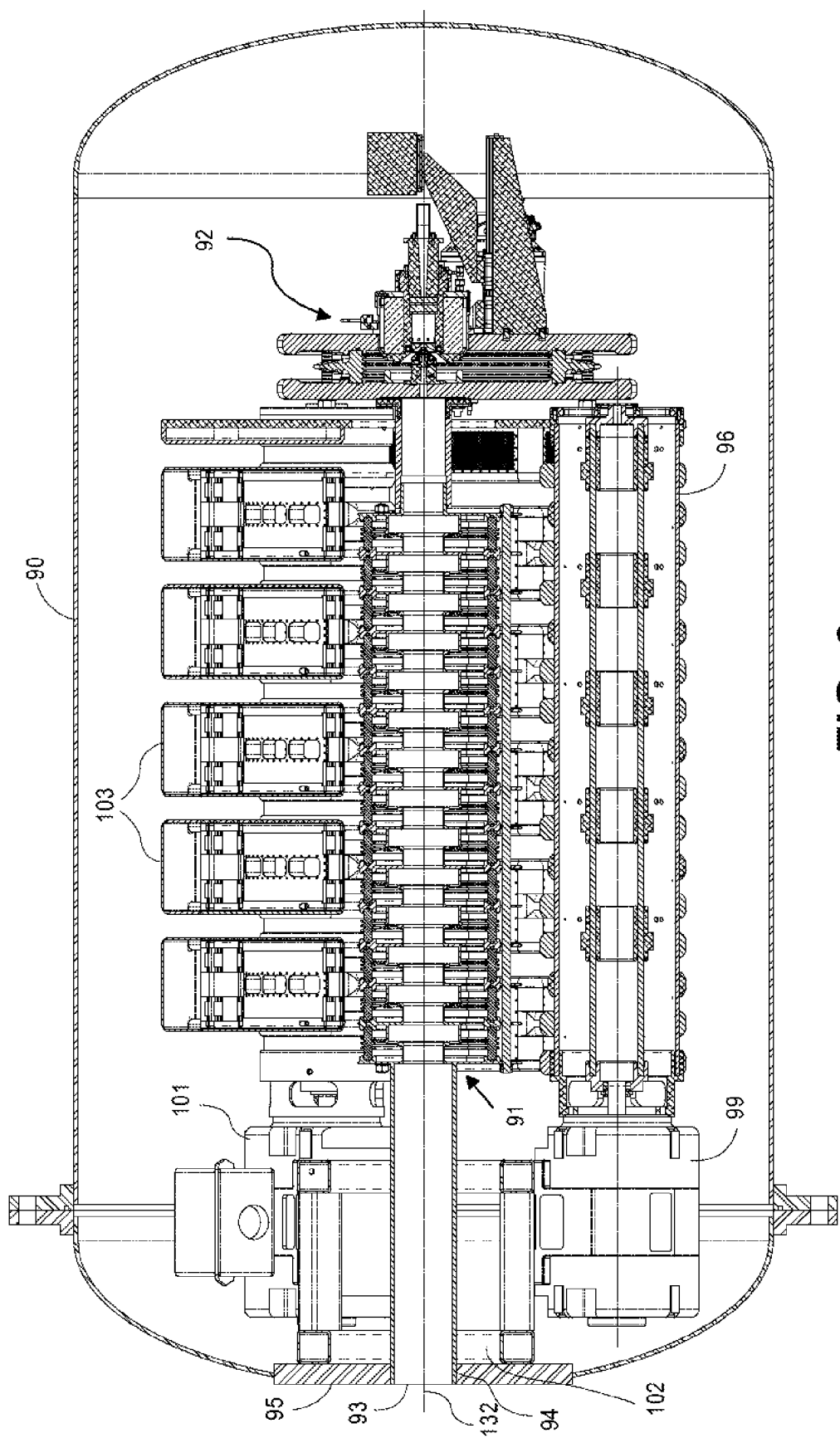
FIG. 6 is a sectional view of a further embodiment of d.c. charged particle accelerator in accordance with the present invention.
Figure 7A:
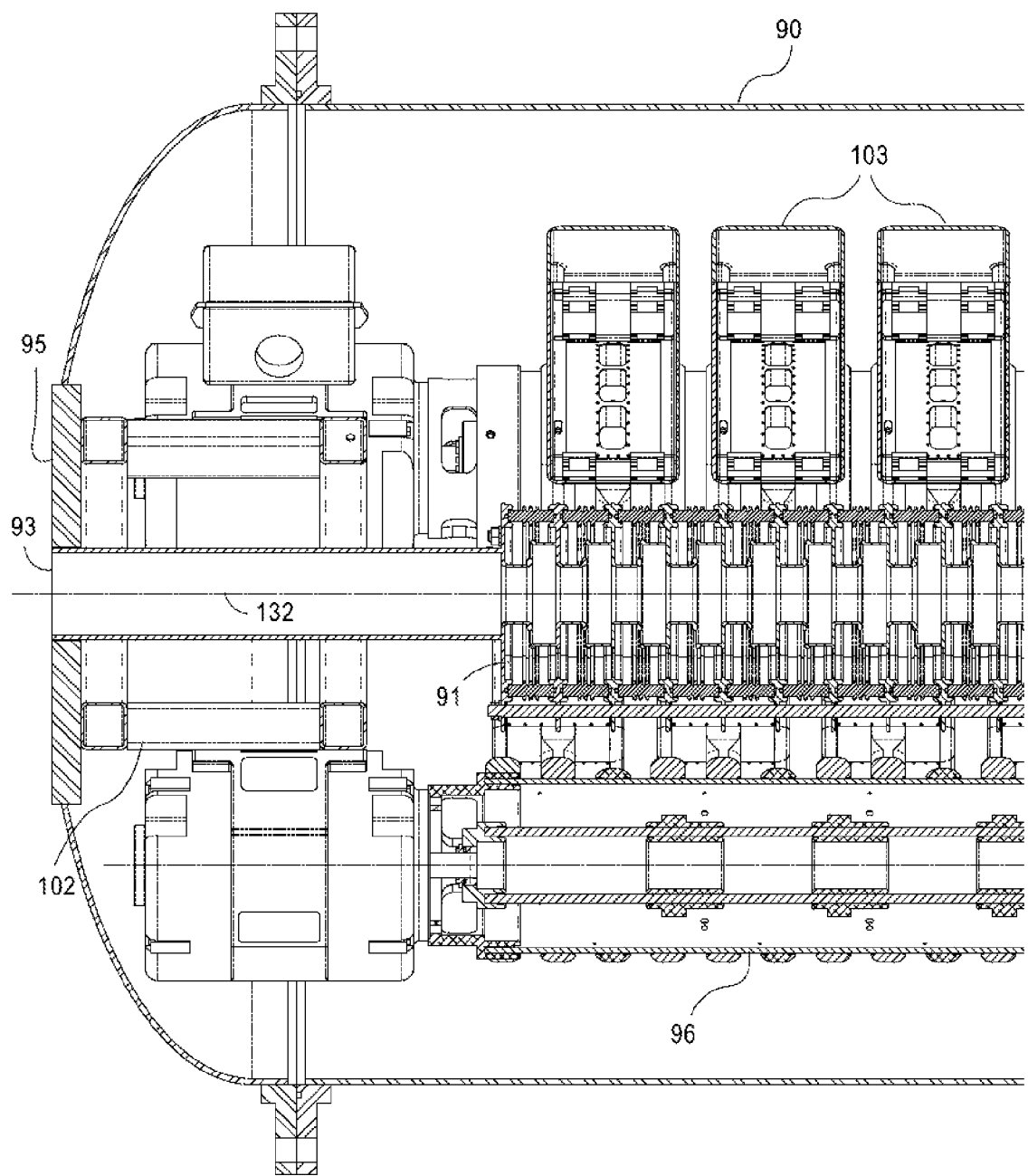
FIGS. 7A and 7B are enlarged views of the left hand and right hand parts of the d.c. charged particle accelerator of FIG. 6.
Figure 7B:
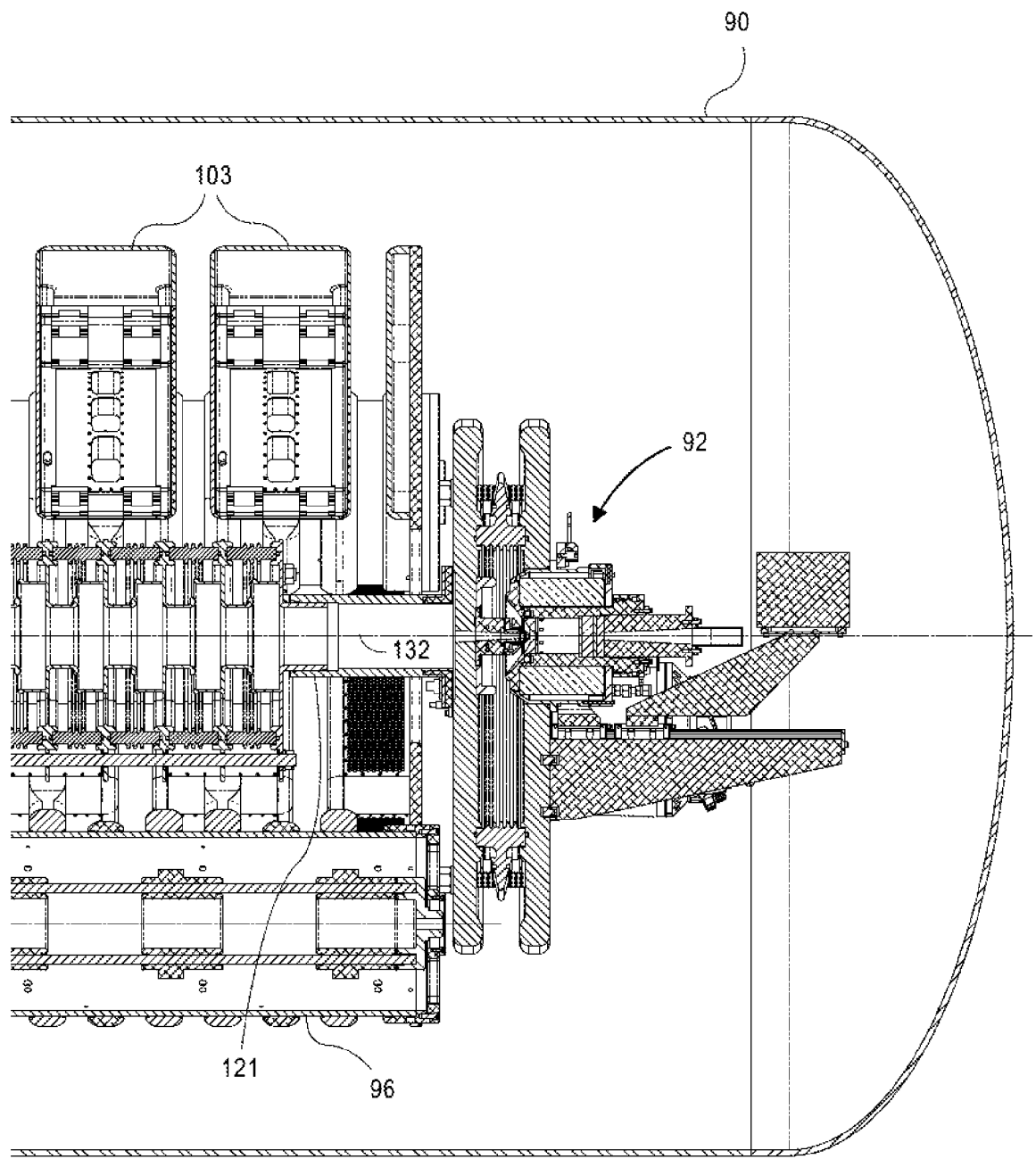

FIGS. 6, 7A, 7B, 8 and 9 illustrate a detailed embodiment of the invention which operates on similar principles to the embodiment described above with reference to FIG. 5. In the drawings, FIG. 6 is a cross-sectional view of a charged particle accelerator, which is enclosed within a gas proof containment vessel 90. FIG. 7A is an enlarged view of the left hand side of the particle accelerator of FIG. 6 and FIG. 7B is an enlarged view of the right hand side of the accelerator of FIG. 6. FIG. 8 is an isometric perspective view of the particle accelerator with the main shell of the containment vessel 90 removed, and FIG. 9 is an isometric cross-sectional view corresponding to FIG. 8.

Within the containment vessel 90, an accelerator tube, indicated generally at 91, extends between an ion source, indicated generally at 92, at an upstream end of the vessel, on the right in FIG. 6, and a downstream end of the vessel on the left in FIG. 6. The accelerator tube 91 comprises an accelerator column having a series of accelerator electrodes alternating with insulating spacers, defining acceleration gaps between the electrodes. At the right hand end of the acceleration column, an extension tube provides a gas tight connection to the plasma chamber of the ion source 92. To the left of the accelerator column, a further extension tube connects through an aperture 93 in the downstream end of the containment vessel 90. The structure of the accelerator tube will be described in more detail with reference to FIG. 10.

The accelerator tube is gas tight between the plasma chamber of the ion source 92 and the aperture 93 and makes a vacuum seal connection at 94 with a strengthened wall portion 95 of the downstream end of the containment vessel 90. In use, further ion beam ducting will be connected to the exterior of the strengthened wall portion 95 of the containment vessel to allow the accelerated beam emerging through aperture 93 to be carried in vacuum to a process chamber for implantation in a substrate as required. Further details of the beam line between the containment vessel 90 and the process chamber of the implanter will not be described but these are well understood by those skilled in this art.

The interior of the containment vessel 90, outside the vacuum tight accelerator tube 91, may contain a dielectric gas, such as sulphur hexafluoride ($SF_6$). $SF_6$ is a known insulating gas which has an electrical breakdown threshold which is higher than air, so that high voltage components within an atmosphere of $SF_6$ can be located closer together without breakdown occurring.

The accelerator tube 91 is surrounded by alternators and power supply units to provide independent regulated voltages across each of the accelerator gaps defined between accelerator electrodes of the electrode column. Alternators are arranged along three common shaft and tube assemblies. One such assembly is illustrated at 96 in FIGS. 6, 7 and 9. The three assembles are distributed symmetrically around the accelerator tube 91 and are aligned parallel with the tube, and consequently parallel with the ion acceleration path along a central axis of the accelerator tube. The three alternator tube and shaft assemblies can be seen at 96, 97 and 98 in FIG. 8. Each of the alternator tube and shaft assemblies 96, 97 and 98 comprises five electrically isolated alternators with the rotors of the five alternators mounted on a common shaft driven by a motor 99, 100, 101 located in the containment vessel 90. The motors 99, 100 and 101 are mounted on a supporting structure 102 which is secured to the strengthened wall portion 95 in the downstream end wall of the containment vessel 90. Further details of the structure of the alternator tube and shaft assemblies will be given later.

Power supply unit casings 103 are also located surrounding the accelerator column, in the circumferential spaces between the alternator tube and shaft assemblies 96, 97 and 98. The casings 103 contain individual power supply units receiving alternating current power from individual alternators and supplying the required high voltage d.c. for connection to adjacent pairs of electrodes of the accelerator column to provide the required gap voltages.

Each of the power supply units contained within casings 103 is entirely electrically isolated from other power supply units, so that the d.c. output voltages of the power supply units can effectively be connected in series to achieve the required total acceleration voltage over the length of the accelerator column. Again, further details of the power supply units and the connection arrangements will be given later.

Figure 11:
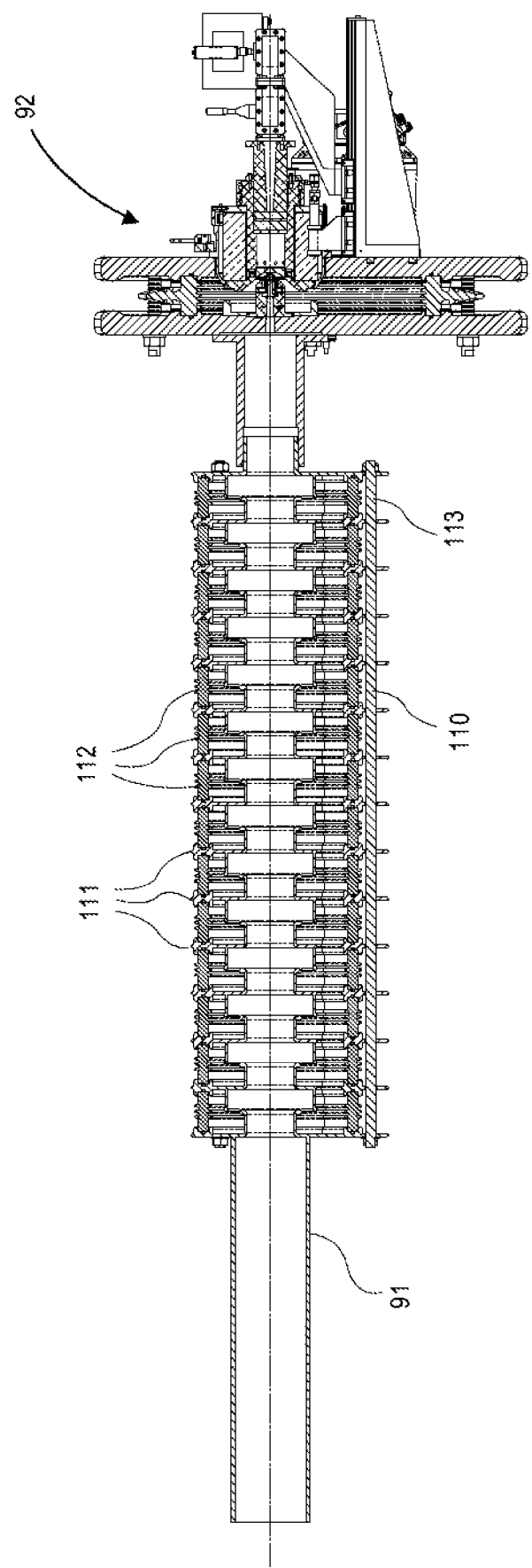
FIG. 11 is a sectional view of the accelerator tube of FIG. 10 in combination with the ion source.

The accelerator tube and ion source assembly is illustrated in more detail in FIGS. 10 and 11, which show the accelerator tube on its own, together with the ion source 92. The accelerator tube comprises electrode column 110 formed of successive electrode plates 111 alternating with insulating spacers 112. The stack of electrode plates 111 and spacers 112 are clamped together with insulating rods 113 to provide vacuum tight seals between the plates and insulators, enabling the interior of the electrode column to be evacuated, as necessary for the transport of an ion beam.

Each electrode plate 111 has a central aperture for the passage of the accelerated beam. To one side of each plate, the right hand side as illustrated in the Figures, the plate is formed with an axial tubular extension 115 at the diameter of the central aperture 114. As is known in this field by those skilled in the art, forming the electrode apertures as cylindrical elements of a defined length is desirable to ensure that the desired electric field gradient is produced by the accelerator electrodes, at the center of the beam path along the accelerator tube. The electrode plates of the electrode column 110 provide end electrodes 116 and 117 at the downstream and upstream ends of the column respectively. Between these end electrodes 116 and 117, electrode plates 111 provide thirteen intermediate electrodes 118, defining fourteen acceleration gaps between adjacent electrodes along the length of the electrode column. The electrode plates 111 of the intermediate electrodes 118 each have a cylindrical flange element 119 located outwardly on the electrode plate from the central aperture of the plate and extending approximately half way between adjacent plates. In combination with the cylindrical elements 115 at the apertures of the electrodes, the cylindrical flanges 119 provide screens to prevent secondary particles and photons which may be generated within the electrode column, e.g. by high energy collisions of beam particles, from reaching the interior surfaces of the insulating spacers 112. This enhances the ability to hold the necessary voltage gradients between electrodes along the electrode column.

At the downstream end of the accelerator tube, the electrode column 110 is formed as an extension tube 120 which extends into aperture 93 (FIGS. 6 and 7) in the pressure vessel forming a vacuum seal with the pressure vessel wall. At the upstream end of the accelerator tube 110, a further extension tube 121 connects the end electrode plate 117 with a flange 122 of the ion source assembly 92.

Figure 12:
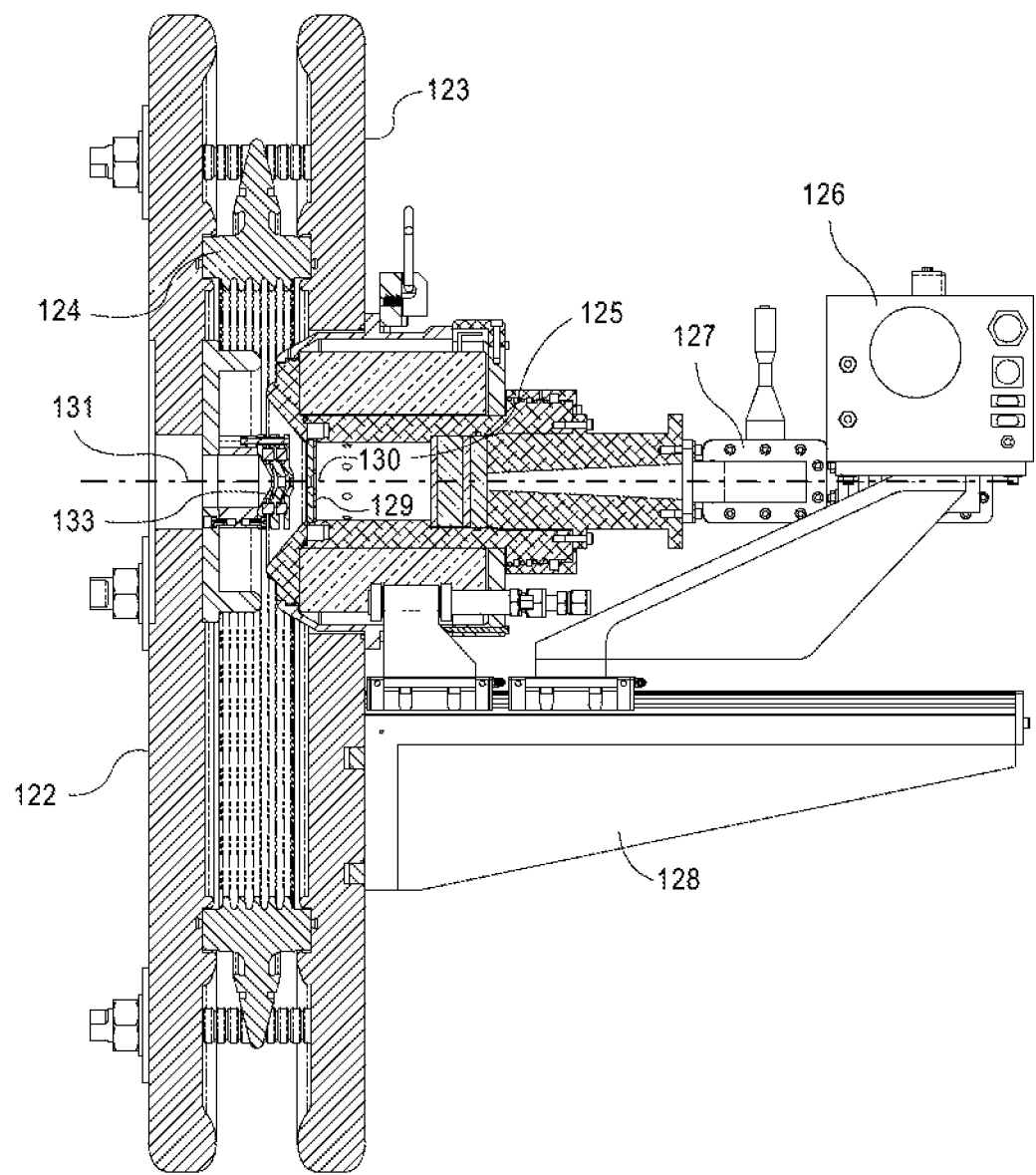
FIG. 12 is an enlarged detailed sectional view of the ion source in FIG. 11.

The ion source assembly 92 is illustrated in more detail in FIG. 12. The main components of the ion source assembly are supported on parallel flanges 122 and 123. These flanges 122 and 123 are separated by an insulating bushing 124. The ion source comprises a plasma chamber 125 supported in the right hand flange 123 (viewed in FIG. 12). Various ion sources are known for producing a plasma in plasma chamber 125 containing desired ions, for example $H^+$ ions. In general for ion sources, a source gas containing molecules of a desired ionic species is fed to the plasma chamber 125 and energy is then supplied to the source gas to ionize it and form a plasma. In the present example, the energy is supplied in the form of microwaves. A microwave generator 126 in the form of a magnetron, for example, produces microwaves which are then fed along a wave guide system to be delivered to the interior of the plasma chamber 125 through a microwave transparent window. As illustrated in FIG. 12, the microwave source 126 and waveguide assembly 127 are mounted on a supporting bracket 128, which is in turn mounted on the flange 123.

The plasma chamber 125 has a front plate 129 defining an aperture 130 on a central line 131 through the plasma chamber. The ion source assembly 92 is itself mounted at the right hand end, as best seen in FIGS. 6 and 7, of the accelerator assembly within the containment vessel 90, so that the central line 131 of the ion source is aligned with central line 132 through the accelerator tube. Ions are extracted from the plasma chamber 125 through the aperture 130 by a suitable bias voltage applied between the body of the plasma chamber 125 and an extraction electrode assembly 133, located immediately in front of the front plate 129 of the plasma chamber. The extraction electrode assembly 133 is supported on the left hand flange 122 of the ion source assembly, which is itself directly connected to the upstream end of the extension tube 121 of the accelerator tube. Accordingly, the flange 122 of the ion source assembly is at the same potential as end electrode 117 of the electrode column.

For the extraction of positive ions, such as $H^+$ ions, from the plasma chamber 125, the plasma chamber body mounted on the right hand flange 123 is biased positively relative to the extraction electrode assembly 133, mounted on the left hand flange 122. The extraction potential applied across the flanges 122 and 123 may, in practice, be comparable to the gap potentials applied across each of the acceleration gaps defined by the electrode column 110.

In a typical arrangement well known to those skilled in this art, the extraction electrode assembly 133 may comprise two electrodes located close together. The electrode of this pair which is furthest from front plate 129 of the plasma chamber may be called the extraction electrode and is biased at the extraction potential relative to the plasma chamber 125, so that extracted ions passing through the extraction electrode, travelling to the left in FIG. 12, have an extraction energy corresponding to this extraction potential. The other electrode of the extraction assembly, located intermediate the extraction electrode and the front plate 129 of the plasma chamber, is referred to as the suppression electrode and is typically bias negatively relative to the extraction electrode. The purpose of the suppression electrode is to prevent electrons from being accelerated by the extraction field back into the plasma chamber, to the right in FIG. 12. The two-electrode assembly in combination with the front plate 129 of the plasma chamber 125 is typically referred to as a triode extraction system. Alternative forms of extraction electrode assembly may be used, including the so-called tetrode system which has an additional electrode in the extraction assembly.

Figure 13:
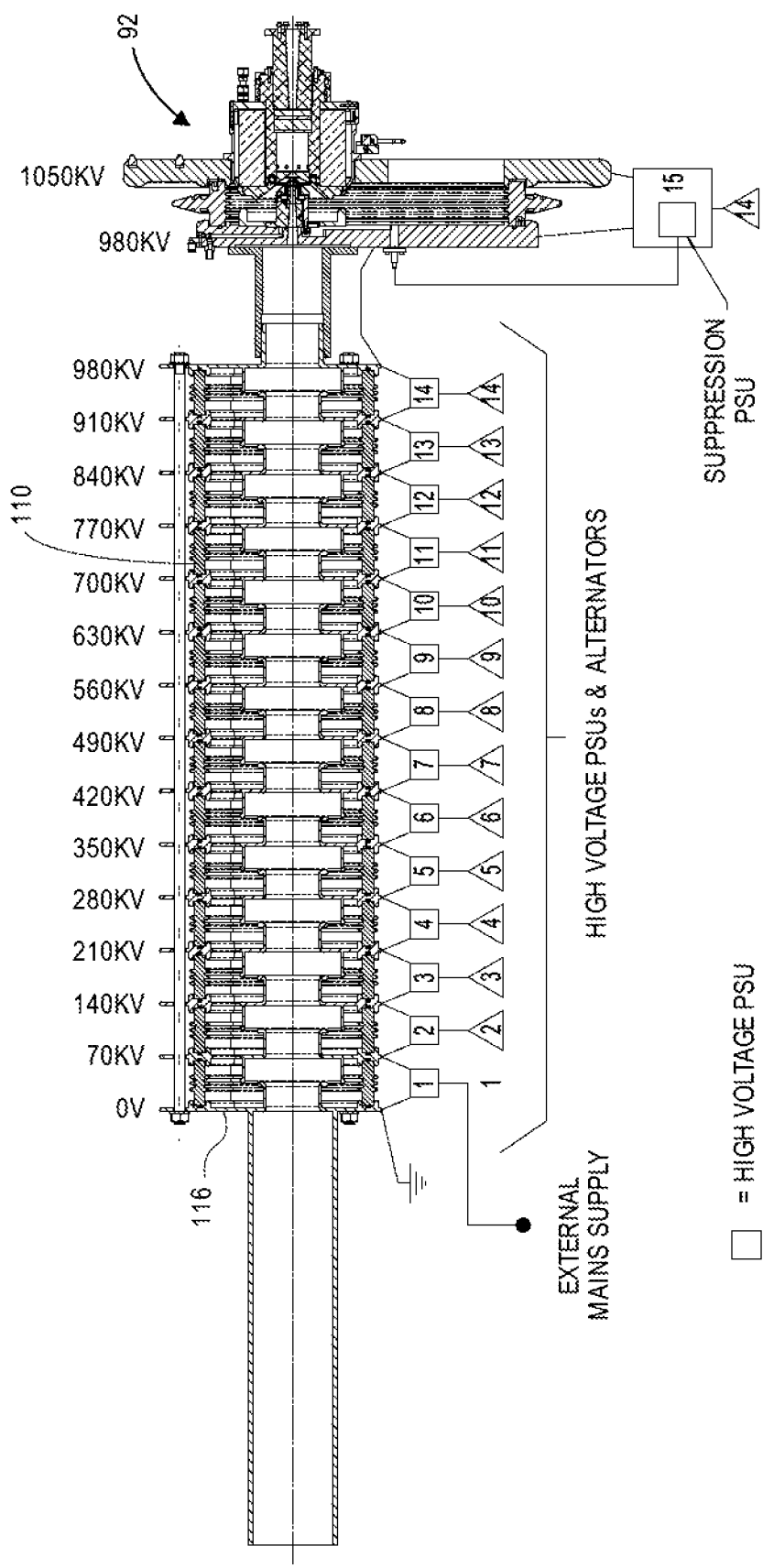
FIG. 13 is a further sectional view of the accelerator tube and ion source of FIG. 11, showing the arrangement of power supply to the accelerator tube and ion source.
Figure 14:
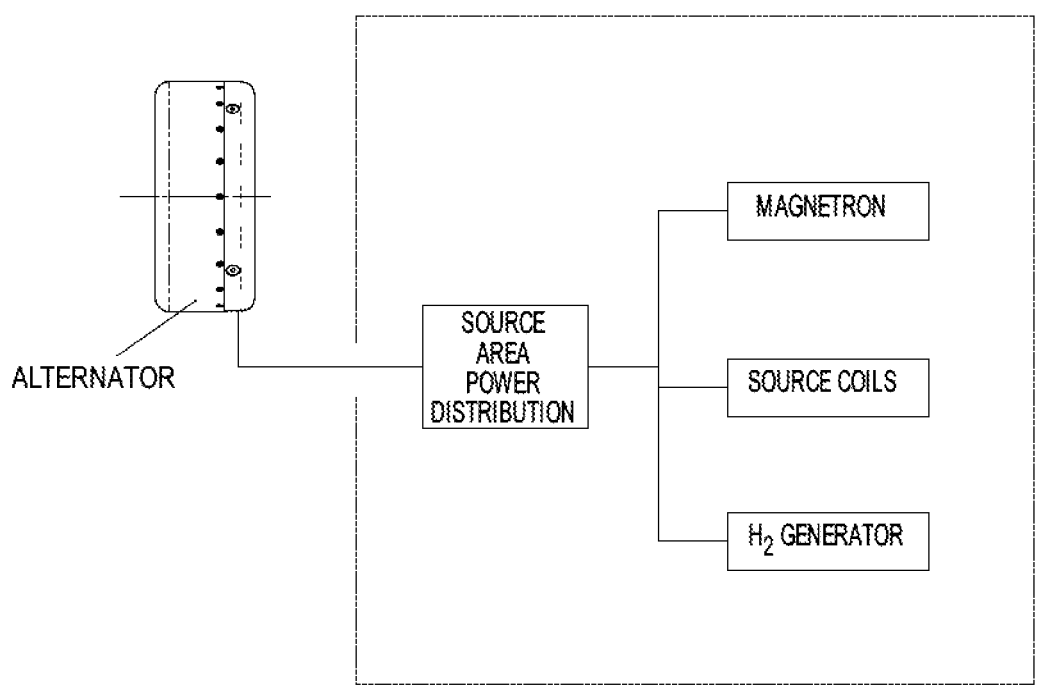
FIG. 14 is a schematic illustration of the power supply distribution to parts within the ion source of FIG. 13.

FIG. 13 is another view of the accelerator tube and ion source of FIGS. 10 and 11, further annotated to illustrate the arrangement of power supplies applying the necessary gap voltages to the various electrodes of the accelerator and also the extraction bias voltages to the ion source. FIG. 14 is a schematic representation of the supply of electrical power to other ion source electrical consumers.

As explained earlier with reference to FIGS. 6, 7 and 8, there are a total of 15 power supply unit housings 103, arranged in banks of five at three symmetrical locations around the accelerator tube. Also, each alternator tube and shaft assembly carries five mutually isolated alternators, so that there are fifteen such alternators in total within the containment vessel 90. In the example illustrated particularly in FIG. 13, gap voltages of 70 kV are applied across each of the acceleration gaps between adjacent pairs of electrodes along the electrode column. The left hand end of the electrode column, together with the extension tube 120 of the accelerator tube, is at ground potential, connected directly to the end wall of the containment vessel. As a result of the fourteen acceleration gaps of the electrode column, the right hand end electrode (117 in FIG. 10) of the electrode column is at 980 kV. The extraction potential applied between flanges 122 and 123 of the source assembly 92 is also, in the example, 70 kV, so that the plasma chamber 125 of the ion source is itself held at a potential of 1050 kV. Accordingly, the entire ion source and electrode assembly produces an ion beam having a nominal energy of just over 1 MeV.

As described previously, each acceleration gap is connected to a separate electrically isolated power supply unit, so that fourteen power supply units (represented by the squares numbered 1-14 in FIG. 13) are used to provide the gap voltages across the fourteen gaps of the electrode column 110. However, it should be noted that the power supply unit connected between the left hand end electrode 116 at ground potential, and the immediately adjacent intermediate electrode at +70 kV, is supplied with input power from an external mains supply through the wall of the containment chamber via a vacuum feed through (not shown). Because this first power supply provides an output voltage which is itself referenced to ground via the ground electrode 116, this power supply unit can indeed be supplied from external mains. Power supply units numbered 2-14 connected across the remaining acceleration gaps of the electrode column 110 are each fed by a respective one of thirteen of the available alternator units on the alternator tube and shaft assemblies 96, 97 and 98 (FIG. 8). The fifteenth available high voltage power supply unit is used to apply the required extraction voltage between flanges 123 and 124 of the ion source, to apply an appropriate bias to the extraction electrode of the extraction electrode assembly 133 (FIG. 12). This particular power supply unit number 15 also contains an additional smaller high voltage supply which is used to apply the electron suppression bias to the electron suppression electrode of the extraction electrode assembly 133. As illustrated in FIG. 13, the power supply unit number 15 is supplied with a.c. input power from alternator number 14.

FIG. 14 shows in schematic form the power supply distribution to other elements of the ion source, which receive power from alternator number 15. Accordingly, power from alternator number 15 is used to supply power to the magnetron generating microwave energy to energize the plasma chamber of the ion source, to power magnetizing coils used for controlling plasma within the ion source, and to control an $H_2$ generator for providing a source of ionizing gas to the ion source.

With the arrangement disclosed in FIGS. 13 to 14, all power supplies which cannot be referenced to external ground potential, are derived from separate mutually isolated alternators within the containment vessel of the accelerator.

Figure 15:
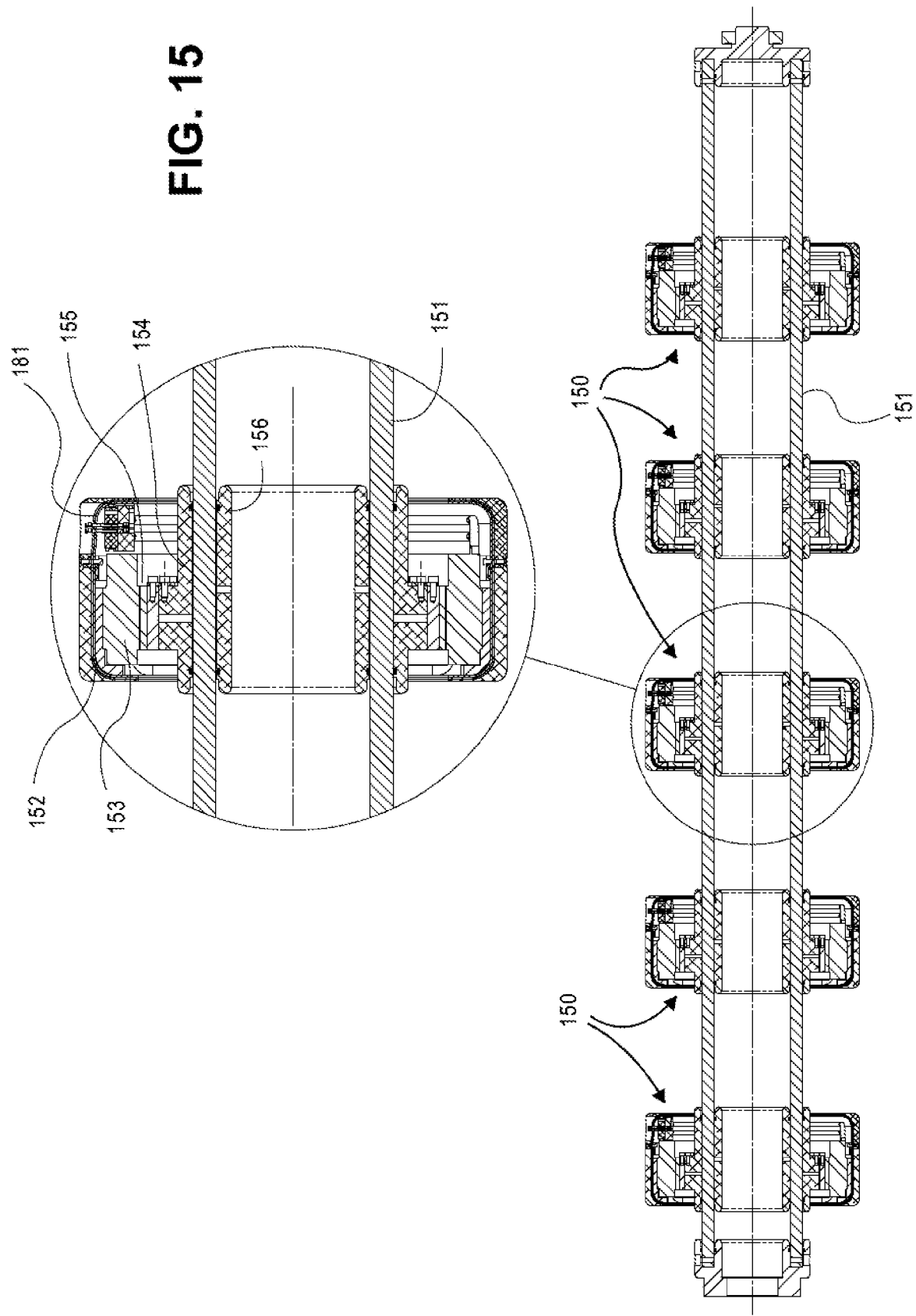
FIG. 15 is a sectional view of alternators assembled on a common rotor shaft, together with an enlarged partial view for clarity.

FIG. 15 is a cross-sectional view of an alternator shaft assembly, forming part of the alternator tube and shaft assemblies 96, 97 and 98 as described above. The illustrated shaft assembly shows both rotors and stators of each of five alternators mounted on common shaft 151. In practice, the alternators are mounted on shaft 151 with rotor and stator effectively "locked" together due to the strong magnetic attraction exerted by the rotor magnets. Shaft 151 is made of a fiberglass material and is electrically insulating, so that there is complete electrical isolation between the alternators 150 spaced axially along the shaft. As illustrated in the enlarged portion of FIG. 15, each alternator 150 comprises a stator unit 152 containing one or more stator windings shown schematically at 153. A rotor unit 154 is mounted for rotation within the stator 152 and carries permanent rotor magnets 155. Rotation of the rotor within the stator produces alternating current in the stator windings 153, as is well understood by those skilled in this field.

Each of the rotors 154 of the alternators 150 along the length of the shaft 151 is secured to the external surface of the shaft, for example by means of grub screws. The shaft 151 may be made as a hollow cylinder, in which case strengthening cylinder sections 156 may be located inside the bore of the shaft 151, registering with the axial location of the rotors 154, to prevent distortion of the cylindrical wall of the shaft 151.

Figure 16:
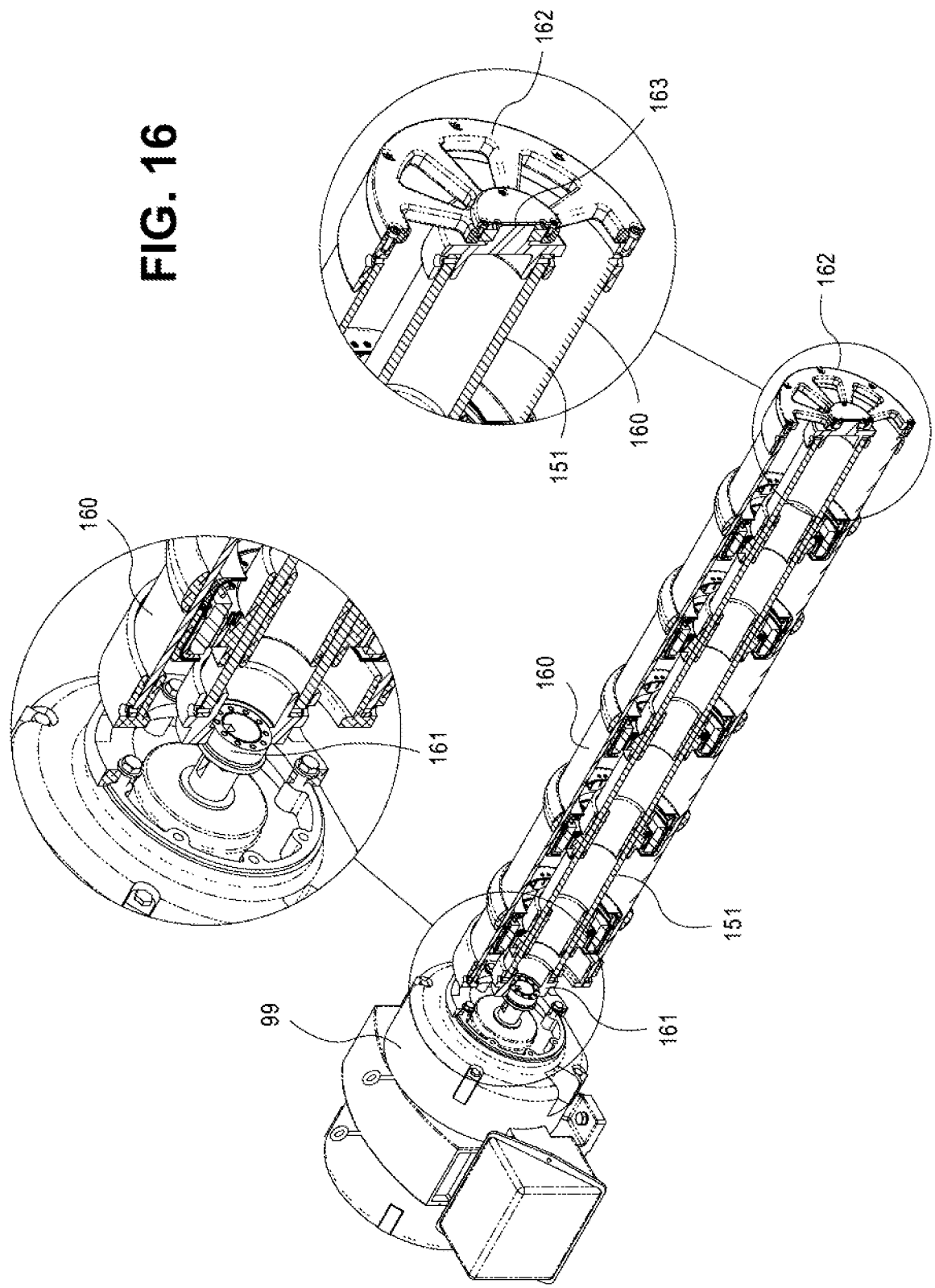
FIG. 16 is a sectional isometric view of the alternator rotor shaft and stator tube in combination with a drive motor, with two enlarged partial views for clarity.

When assembling the accelerator, rotor assemblies as illustrated in FIG. 15, comprising both the rotor and stator elements of alternators 150 located on rotor shaft 151, are inserted into tubular elements as shown at 160 in FIG. 16. Each of the tubular elements 160 is fastened at one end to the casing of a respective one of the drive motors 99, 100 and 101. A corresponding end of the rotor shaft 151 is connected to the rotor of the respective motor 99, as indicated at 161. A bearing cap 162 is fastened at the other end of the tube element 160 so as to provide a rotary bearing 163 to support the opposite corresponding end of the rotor shaft 151. To complete the assembly of the alternators, the entire rotor shaft assembly 151 with both rotors and stators is rotated inside the tube element 160, until the angular alignment of the stators is as desired. Then, the stators are fastened within the tube element 160 and centered relative to the rotors on the rotor shaft 151, to enable the rotors on the rotor shaft to rotate within the stators to generate a.c. electrical power as required.

As with the rotor shaft 151, the tube element 160, carrying the stators of the alternators, is made of an electrically insulting material, typically fiberglass, so that the stators of the alternators are also completely electrically isolated from each other.

Figure 18:
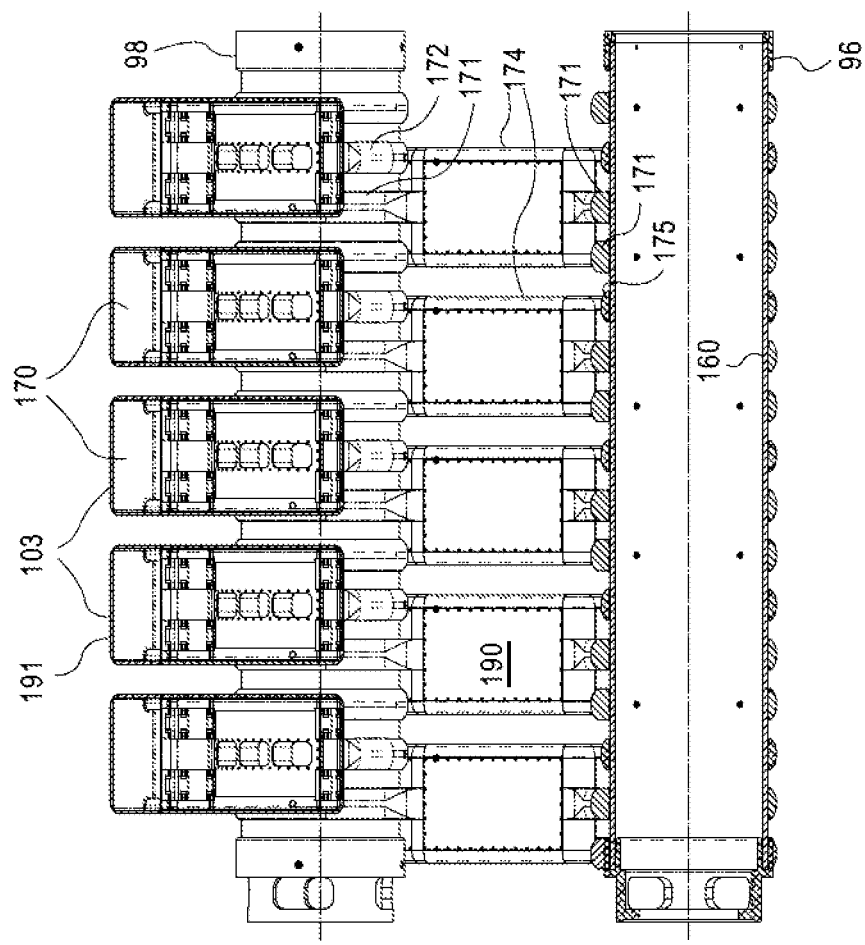
FIG. 18 is a sectional view taken along line A-A of the alternator assembly and power supply casing assembly of FIG. 17.
Figure 17:
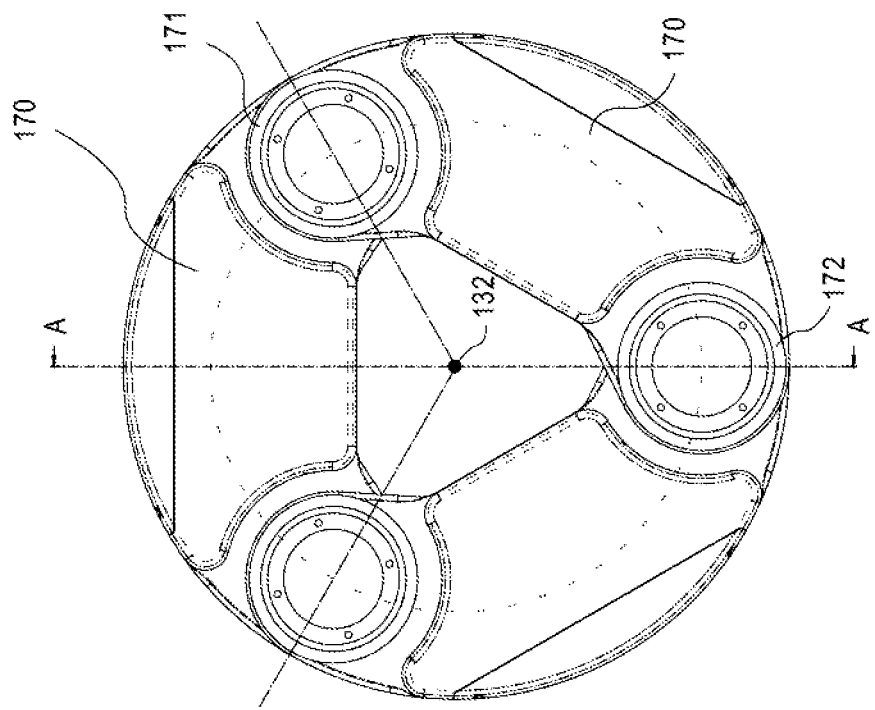
FIG. 17 is an end view of an assembly comprising three alternator shaft and tube assemblies with interconnected power supply casings.

FIGS. 17 and 18 illustrate the assembly of the power supply unit casings 103 together with the stator tubes 160. FIG. 17 illustrates the assembly viewed from one end, essentially along the line of the central axis 132 of the accelerator. FIG. 18 is an axial section of the assembly taken along line A-A of FIG. 17. Each individual PSU casing 103 comprises a central housing area 170, which contains the power supply electronics, and lateral ring elements 171 and 172, which embrace and are secured to neighboring stator tubes 160. As described previously, a total of fifteen power supply casings 103 are arranged in three groups of five distributed symmetrically about the central axis 132, as shown in FIG. 17, effectively interconnecting the three stator tubes 160 of the three alternator assemblies. The casings 103 in each bank are spaced evenly along in the axial direction (relative to the center axis 132). However, the casings of the three banks are evenly staggered relative to each other in the axial direction. This can best be seen in FIG. 18, which shows one bank of casings 103 (in section) and associated ring elements 172 connecting the casings 103 of the bank to the stator tube of the alternator assembly 98. Also in FIG. 18, power supply casings (174) of a second bank each have a ring element 171 embracing the stator tube of the alternator assembly 98 and a ring element 172 embracing the stator tube 160 of alternator assembly 96. In FIG. 18, only a section of ring element 171 of the third bank of power supply unit casings is illustrated, embracing stator tube 160 of alternator assembly 96. It can be seen, therefore, that the stator tube of each of the alternator assemblies carries ring elements of the two neighboring banks of power supply housings. A third group of dummy ring elements 175 are provided on each of the stator tubes 160, so that ring elements are provided on the stator tubes at axially equal spacings, in order to provide good electrostatic uniformity.

Figure 19:
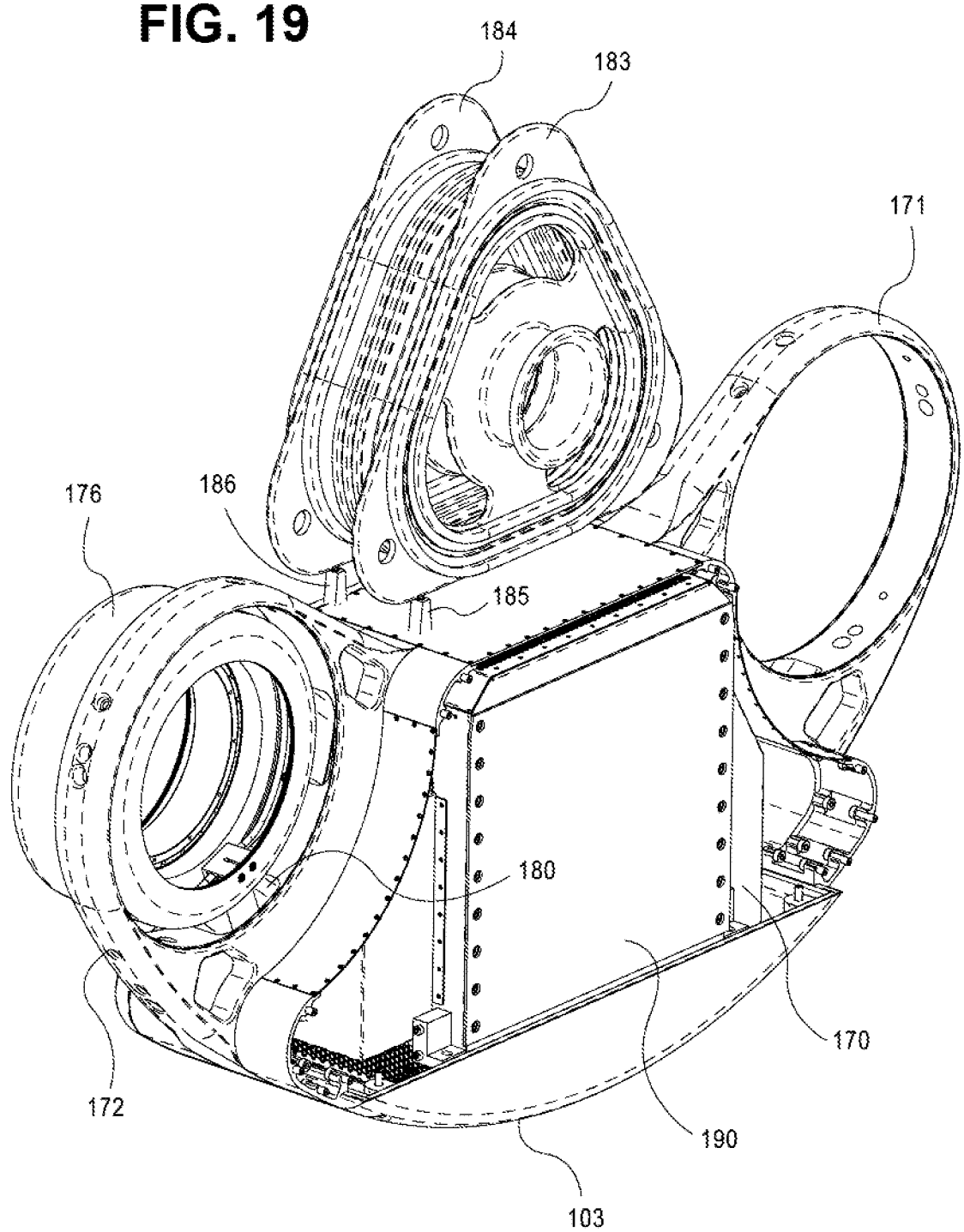
FIG. 19 is an isometric view of a single power supply casing with associated electrodes of the electrode column.

The stator and rotor elements of the alternators on the alternator assemblies 96, 97 and 98, are axially located to align with the ring elements 172 associated with a respective one of the power supply unit casings 103. Thus, as more easily seen in FIGS. 19 and 20, ring element 172 of the power supply unit casing effectively surrounds alternator 176. FIG. 19 is an isometric representation of a single power supply casing with associated electrodes of the electrode column. In FIG. 19, the stator tube 160 is omitted for clarity. An aperture 180 extends from the interior of the ring element 172 into the interior of the housing area 170 of the PSU casing 103. A corresponding aperture is provided through the cylindrical wall of the stator tube (not shown), and the alternator 176 is orientated about its axis, within the ring element 172, so that a power connector site 181 (best seen in FIG. 15) is aligned with the aperture 180. An umbilical connector 182 (FIG. 20) can be plugged through the aperture 180 to make connection with the connector site 181 of the alternator, in order to supply alternator output as input power to the power supply unit housed in the housing area 170 of the casing 103.

Figure 20:
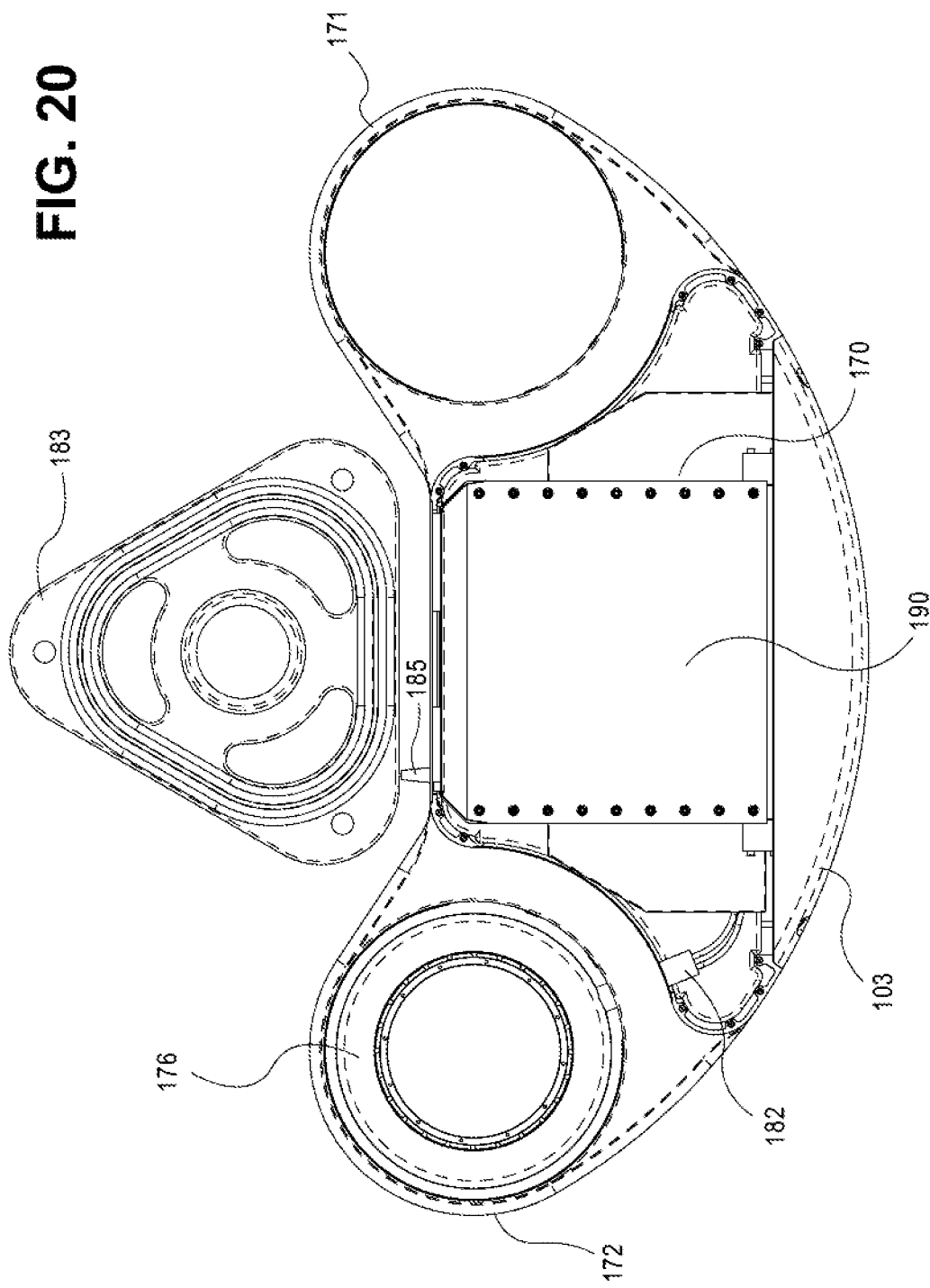
FIG. 20 is a plan view of the power supply casing and electrode assembly of FIG. 19.

FIGS. 19 and 20 also show an adjacent pair 183 and 184 of the electrodes of the electrode column 110 of the accelerator. There is no structural connection between the electrode column 110 and the surrounding assembly of casings 103 and alternator assemblies 96, 97 and 98. The electrode column is structurally supported at each end, with the ground electrode 116 at one end connected via extension tube 120 to the downstream end of the containment vessel, and the high voltage end electrode 117 supported via an extension tube 121 on flange 122 of the extraction assembly of the ion source (FIG. 10). Similarly, one end of each of the alternator assemblies 96, 97 and 98 is supported, via respective alternator motors, from the structure 102 fastened to the strengthening plate 95 at the downstream end of the containment vessel (FIG. 9). The other end of each of the stator assemblies 96, 97 and 98 is connected to the flange 122 of the extraction assembly of the ion source. Due to the fact that the alternator assemblies are substantially incompressible, this structure has reasonable rigidity, allowing the entire unit to be suspended cantilever fashion from the downstream end of the containment vessel. In order to support any "droop" in the structure under the influence of gravity, angled tie rods may be incorporated, made of insulating material.

As illustrated in FIG. 19, two high voltage connections, shown at 185 and 186, are made from power supply housings 103 to adjacent pairs of electrodes 183 and 184. Connection 185 provides a local ground connection to electrode 183, and connection 186 provides a local high voltage connection to adjacent electrode 184. A power supply unit within the housing 170 of the casing 103 generates an appropriate voltage between the connections 185, 186 corresponding to the required gap voltage of the accelerator, for example a gap voltage of 70 kV in accordance with the illustration of FIG. 13.

Considering FIG. 13, the power supply contained in the housing 170 of casing 130 illustrated in FIG. 19 may represent, for example, power supply unit number 4. The next higher power supply unit number 5 would then be formed by a power supply unit in a casing corresponding to casing 103 which is next closest axially along the stator tubes 96, 97 and 98. For example, the fourth power supply from FIG. 13, would be the power supply within the casing 190 as seen in FIG. 18, which has a ring element which is the fourth ring along from the left on the stator tube 98. The next higher power supply unit (the fifth) is housed in casing 191 as shown in FIG. 18, which has the fifth ring element along on the stator tube 98. The corresponding local ground connection from this next higher power supply unit is connected to electrode 84 (FIG. 19), so that this next higher power supply unit is effectively connected in series with the previous one.

Figure 21:
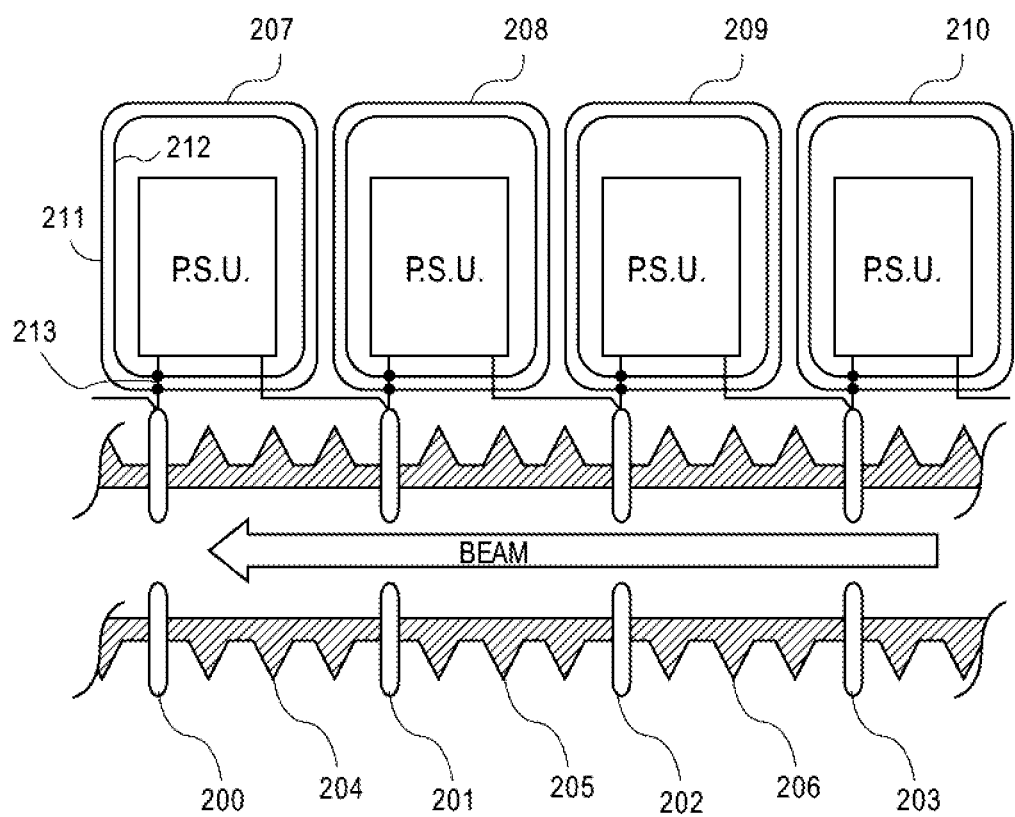
FIG. 21 is a schematic representation of the interconnection of power supply units and electrodes of the d.c. charged particle accelerator.

FIG. 21 is a schematic illustration of the interconnection regime for the various high voltage power supply units of the accelerator. In this schematic representation, adjacent electrodes 200, 201, 202 and 203 are separated by insulating spacers 204, 205 and 206. Successive power supply units connected in series are illustrated at 207, 208, 209 and 210. It should be understood from the preceding description that in fact successive power supplies will not be located adjacent to each other as schematically illustrated in FIG. 21. If power supply 207 is in one of the banks of power supplies described previously, the electrically following power supply, 208 in FIG. 21, is located in a second bank, angularly spaced around the axis of the accelerator column, and the next power supply, 209 in FIG. 21, is located in the third bank. Power supply unit 210 in FIG. 21 represents the power supply unit which will in fact be located physically next to power supply 207 in the same bank of power supplies. Nevertheless, the interconnection of the various power supplies is as illustrated in FIG. 21.

Thus, each of power supplies 207, 208, 209 and 210 is connected between a respective adjacent pair of electrodes, so that the successive power supplies are effectively connected in series to provide successive gap voltages along the length of the accelerator column. Each of the power supply units has a double casing. For example, power supply unit 207 has an outer casing 211, which corresponds to the casing 103 (shown in FIGS. 19 and 20 with a front panel removed). Within outer casing 211, each power supply unit is within an inner casing 212, which is constituted by the inner casing 190 illustrated in FIGS. 19 and 20. The inner casing 212 (190) is fully insulated from the outer casing 211 (103) except at a single interconnection point illustrated in FIG. 21 at 213. This interconnection point 213 between the inner and outer casings is also connected to the local ground of the power supply unit within the inner casing 212, and is further connected via connection 185 to electrode 200 (183 in FIG. 19). The high voltage output from the power supply unit within the inner casing 212 is supplied through both of the casings 212 and 211 for connection to the next adjacent electrode 201 in FIG. 21 (184 in FIG. 19). As described previously, the ground connection for the next power supply unit 208 is also connected to electrode 201, and the high voltage output of the next power supply unit 208 is connected to the following electrode 202, as further illustrated.

With this double casing arrangement and single earth point for each power supply unit, the electronics of the power supply units within the inner casings 212 are protected from the effect of high currents resulting from potential discharge of stray capacitances, for example the capacitances between adjacent casings 211 of the power supply units, and between the casings of the power supply units and the outer containment vessel wall.

Figure 22:
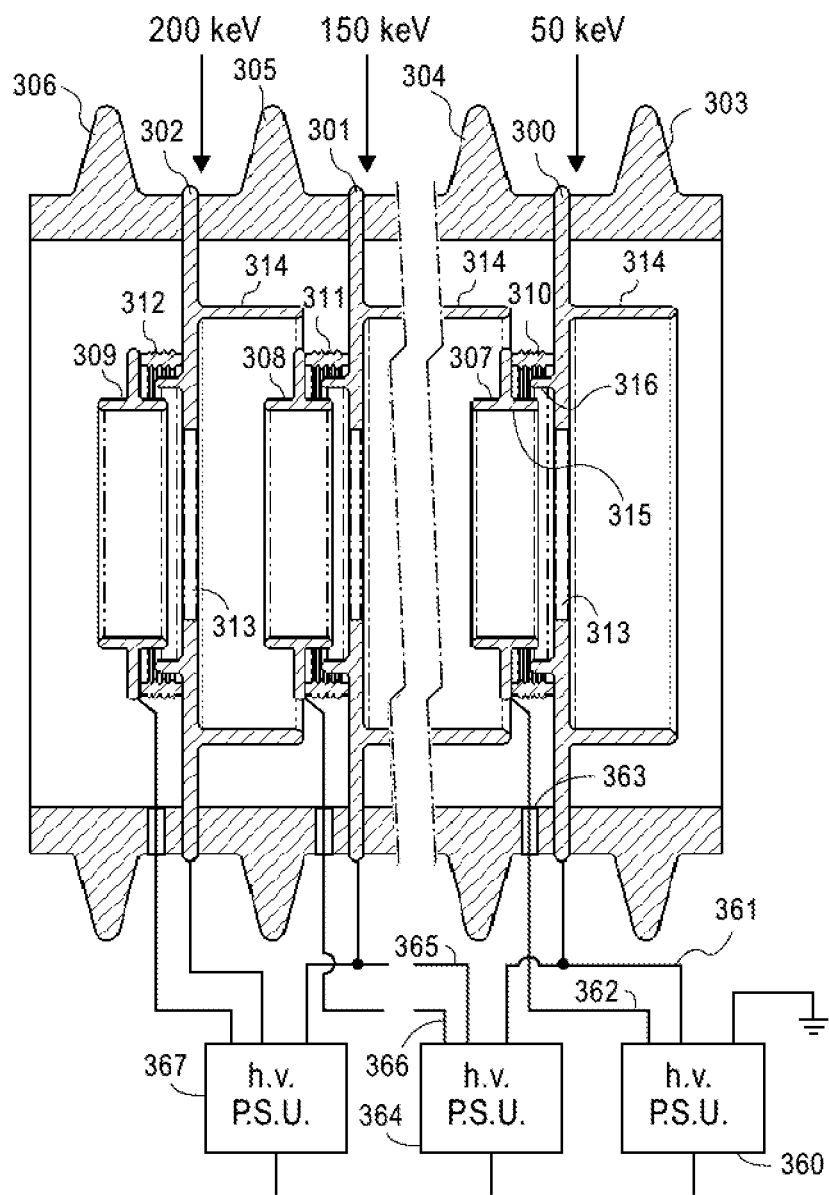
FIG. 22 is a sectional schematic representation of a further embodiment of electrodes for a d.c. charged particle accelerator, incorporating electron suppression rings.

FIG. 22 illustrates a further embodiment of electrode column for the d.c. charge particle accelerator. Known particle accelerator columns comprise two or more accelerator electrodes spaced by insulator elements. Power supply apparatus applies desired gap voltages across adjacent pairs of electrodes to provide the required acceleration voltage along the column. A known problem with d.c. accelerator columns is that accelerated ions can generate secondary electrons, for example as a result of collisions with the accelerating electrodes and any residual gas molecule along the accelerated beam path through the accelerator. Such secondary electrons are accelerated by the accelerator voltages in the reverse direction back upstream and can generate unwanted and even hazardous radiation, and also produce an additional current drain on the high voltage power supply.

It is normal practice within d.c. particle accelerators to provide some form of electron suppression. Electron suppression along the length of the accelerator column has been provided by the provision of appropriate magnetic fields to deflect electrons so that they strike a surface and are neutralized before they can be accelerated to high energies.

The problem of electron suppression in a particle accelerator is particularly relevant for the acceleration of positively charged particles or positive ions. The present embodiment provides an additional suppression ring in front of at least one of the electrodes of electrode column of a d.c. positive ion accelerator. The electrode suppression ring is biased to a voltage which is somewhat negative relative to the accelerator electrode. Each individual electrode of the accelerator column may be fitted with a suppression ring as described.

Referring now more particularly to the structure illustrated in FIG. 22, a section of the accelerator column of a d.c. charged particle accelerator is illustrated having accelerator electrodes 300, 301 and 302, separated by insulating spacers 303, 304, 305 and 306. In the illustrated example, the gap voltage applied across each adjacent pair of electrodes in the electrode column is 50 keV, but any appropriate gap voltage may be applied. It will be appreciated also that an accelerator electrode that would be located between electrodes 300 and 301 has been omitted in order to reduce the size of the figure. FIG. 22, therefore, illustrates electrodes applying gap voltages of 50 keV up to a voltage on electrode 302 of 200 keV. The column illustrated may have further electrodes and insulators, further increasing the total voltage of the accelerator as desired. For example, the accelerator may have 14 acceleration gaps, like the accelerator column 110 illustrated in FIG. 13 in the description above.

In the example, for accelerating positive ions, a source of ions is located to the left of the electrode stack illustrated so that positive ions are accelerated from a high voltage towards ground, from left to right in the Figure.

A respective suppression ring 307, 308, 309 is mounted immediately in front of each of the accelerator electrodes 300, 301 and 302. In this example, the suppression ring 307 is mounted by means of an insulator 310 directly from electrode 300. Similarly, suppression rings 308 and 309 are mounted directly from electrode 301 and 302 on respective insulators 311 and 312.

Each of the accelerator electrodes 300, 301, 302 comprises an annular plate with a central aperture 313 for the passage of the accelerated beam. On the downstream side of each electrode 300 there is a cylindrical extension flange 314, which serves to provide screening of the interior surfaces of the insulators 303, 304, 305 and 306. Each suppression ring 307 comprises a cylindrical element 315 having an internal diameter which is somewhat greater than the diameter of the aperture 313 in the accelerator electrode 300. The cylindrical element 315 of the suppression ring 307 is mounted on the insulator 310 so as to extend somewhat into the cylindrical flange 314 of the neighboring upstream electrode. A further cylindrical flange element 316 is formed on each accelerator electrode 300 extending upstream. The diameter of the cylindrical flange element 316 is greater than the outer diameter of the cylindrical element 315 of the suppression ring 307 and the flange 316 overlaps with the cylindrical element 315 so as to provide screening of the interior surfaces of insulator 310. Cylindrical elements 315 of the suppression rings 307 also overlap with cylindrical flanges 314 of the next upstream accelerator electrode, to enhance the screening of the interior surfaces of the main spacing insulators 303, 304, 305 and 306.

In accordance with this embodiment, each of suppression rings 307, 308, 309 is biased negatively relative to the accelerator electrodes 300, 301 and 302. Then, electrons generated in the region immediately downstream of the respective suppression rings are prevented from being accelerated back upstream. In this way, secondary electrons generated by beam ions striking accelerator electrodes 300, 301, 302, for example, are trapped downstream of the respective suppression electrodes 307, 308 and 309 and will not be accelerated back upstream.

Figure 23:
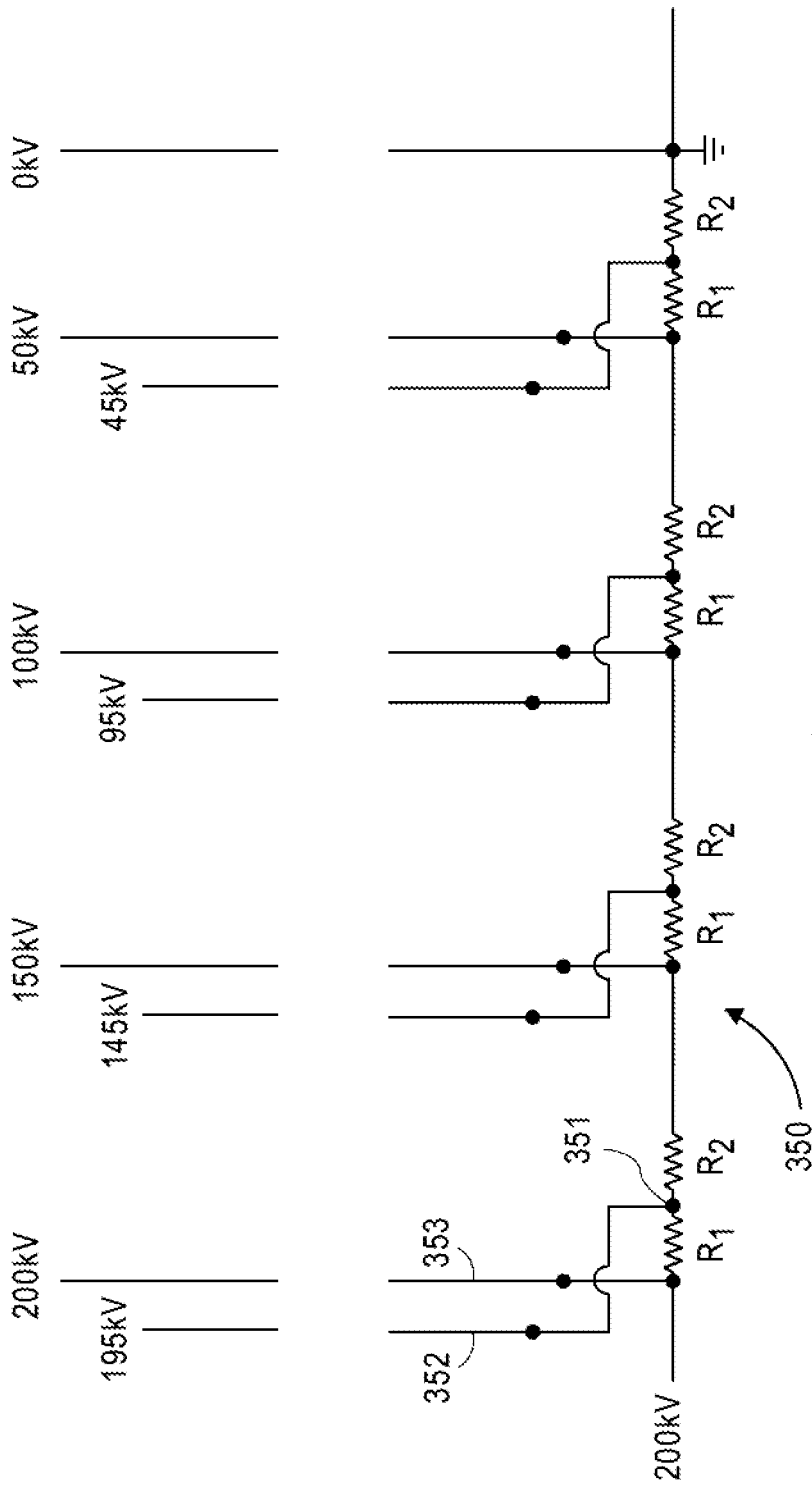
FIG. 23 is a schematic representation of an arrangement for applying bias voltages to the electrodes and suppression rings of the structure of FIG. 22.

FIG. 23 illustrates an arrangement for applying the bias voltages to the suppression rings 307, 308 and 309. In FIG. 23, the gap voltages across adjacent pairs of electrodes are provided by a potential divider indicated generally at 350. Each element of the potential divider between adjacent pairs of accelerator electrodes comprises series connected resistors R1 and R2. If the negative bias voltage applied to each suppression electrode is one tenth of the gap voltage applied between adjacent pairs of accelerator electrodes, then R2=9*R1. As can be seen in FIG. 23, the potential divider 350 splits the applied voltage from a supply of 200 kV equally between the successive accelerator electrodes so that the voltage gap across each is 50 kV. A series connection point 351 between the resistors R1 and R2 of each stage is connected back to the suppression ring 352 located upstream of the accelerator electrode.

Instead of the arrangement illustrated in FIG. 23, the suppression rings of the embodiment of FIG. 22 can be biased using the individual electrically isolated h. v. power supply units 60, 61 and 62 described above in connection with FIG. 5. Then, each h. v. power supply unit 60, 61 and 62 includes additional circuitry to generate a further output voltage, which is less than the required gap voltage, by the amount of negative bias to be applied to the suppression ring. An arrangement of this kind is illustrated in FIG. 22. An h. v. power supply unit 360 is illustrated providing an output voltage on 361 to set the gap voltage (50 kV) on electrode 300. H. v. power supply unit 360 provides a further output on line 362 connected to supply a voltage of 45 kV to suppression ring 307 which is mounted on the electrode 303. The connection 362 to suppression ring 307 is provided via a vacuum feed through 363 through insulating spacer 304.

As shown in FIG. 22, the next h. v. power supply unit 364 is connected in series with the power supply unit 360 and provides similar output voltages on lines 365 and 366 to set the next higher accelerator electrode at 100 kV, and its associated suppression ring at 95 kV. FIG. 22 also shows a third h. v. power supply unit 367 providing the gap voltage between electrodes 301 and 302, and also providing the bias voltage to suppression ring 309.

Embodiments of the invention have been described above by way of example. Although one of the described embodiments has an electrode column providing fourteen acceleration gaps, other embodiments may be contemplated having fewer or more gaps with appropriate numbers of regulated power supplies.

A structure has been disclosed with three banks of five alternators distributed symmetrically around the accelerator column. Each alternator assembly may comprise fewer or more individual alternators and the structures can be contemplated with fewer or more alternator assemblies.

A total of fifteen regulated power supply units have been disclosed to generate gap voltages across each of fourteen gaps between electrodes of the accelerator column, plus the extraction voltage in the ion source. Each of these regulated power supply units can be remotely controlled from outside the containment vessel of the accelerator, using known techniques. For example, control signals can be supplied to the regulated power supply units using optical signals transmitted over optical fiber. In this way control signals can be supplied to each individual regulated power supply unit without compromising the electrical isolation of the power supply units.

The embodiment of the invention described above with reference to FIGS. 6 to 21 can provide a charged particle accelerator producing a high energy, high current beam which has good stability. The use of separate regulated supplies for each acceleration gap can be expected also to enhance resistance to the Total Voltage Effect. Total Voltage Effect is the name given to the observed increasing tendency in accelerators for runaway breakdowns to occur at higher total energies.

In general, a variety of examples and embodiments have been provided for clarity and for completeness. Other embodiments of the invention will be apparent to one of ordinary skill in the art when informed by the present specification. Detailed methods of and system for accelerating charged particles have been described herein but any other methods and systems can be used within the scope of the invention. The foregoing detailed description has described only a few of the many forms that this invention can take. For this reason this detailed description is intended by way of illustration and not by way of limitation. It is only the following claims including all equivalents which are intended to define the scope of the invention.

The invention claimed is:

1. A d.c. charged particle accelerator comprising:
   accelerator electrodes including end electrodes and at least N-1 intermediate electrodes, said accelerator electrodes defining at least N acceleration gaps between adjacent pairs of said electrodes, where N is at least three; and
   regulated d.c. high voltage power supply apparatus having N pairs of output lines connected to respective adjacent pairs of said accelerator electrodes defining said N acceleration gaps, said regulated d.c. high voltage power supply apparatus operative to provide N regulated high voltage d.c. output voltages on said N pairs of output lines to provide gap voltages across said N acceleration gaps, said N regulated high voltage d.c. output voltages being electrically isolated from each other;
   wherein said regulated d.c. high voltage power supply apparatus comprises:
   N d.c. voltage generators being d.c. isolated from each other, each of said voltage generators having a respective one of said N pairs of output lines and being arranged to generate a respective one of said N regulated high voltage d.c. output voltages from input electric power delivered to said voltage generator; and
   d.c. isolating power delivery apparatus arranged to deliver said input electric power to said N voltage generators while maintaining d.c. isolation between said voltage generators;
   wherein said N d.c. voltage generators comprise N d.c. high voltage power supply units providing said regulated high voltage d.c. outputs from unregulated input electric power;
   wherein said d.c. isolating power delivery apparatus comprises N alternators to deliver a.c. power as said unregulated input electric power to respective said d.c. high voltage power supply units;
   wherein each said alternator comprises a stator having at least one stator winding and a rotor carrying at least one rotor magnet to produce a rotating magnetic field in said stator to induce alternating currents in said stator winding to provide said a.c. power;
   wherein said stators of at least two of said alternators are axially aligned;
   and said d.c. isolating power delivery apparatus comprises at least one common rotor shaft carrying, axially spaced along said shaft, said rotors of said at least two alternators, and a motor connected to rotate said common rotor shaft.

2. A d.c. charged particle accelerator as claimed in claim 1, wherein said regulated d.c. high voltage power supply apparatus is operative to provide said N regulated output voltages having a common value (Vgap).

3. A d.c. charged particle accelerator as claimed in claim 1, wherein said common rotor shaft provides electrical isolation of each of said rotors carried by said rotor shaft.

4. A d.c. charged particle accelerator as claimed in claim 3, wherein said common shaft is formed of electrically insulating material.

5. A d.c. charged particle accelerator as claimed in claim 1, wherein said d.c. isolating power delivery apparatus further comprises a stator tube carrying, axially spaced along said stator tube, said stators which are axially aligned, said common rotor shaft being mounted for rotation within said stator tube.

6. A d.c. charged particle accelerator as claimed in claim 5, wherein said stator tube provides electrical isolation of each of said stators carried by said stator tube.

7. A d.c. charged particle accelerator as claimed in claim 6, wherein said stator tube is formed of electrically insulating material.

8. A d.c. charged particle accelerator as claimed in claim 1, wherein said alternators are arranged in at least two groups, said stators of said alternators in each group being axially aligned; and
   said d.c. isolating power delivery apparatus comprises one said common rotor shaft for each group of alternators.

9. A d.c. charged particle accelerator as claimed in claim 8, wherein said d.c. isolating power delivery apparatus comprises a respective said motor connected to rotate each said common rotor shaft.

10. A d.c. charged particle accelerator as claimed in claim 1, wherein said d.c. accelerator is a linear accelerator having an elongate accelerator tube containing said accelerator electrodes, defining a linear acceleration path for charged particles through the said accelerator; and
    said at least one common rotor shaft is mounted alongside said accelerator tube and aligned parallel to said acceleration path.

11. A d.c. charged particle accelerator as claimed in claim 10,
    wherein said alternators are arranged in three groups, said stators of said alternators in each group being axially aligned;
    wherein said d.c. isolating power delivery apparatus comprises one said common rotor shaft for each group of alternators; and
    wherein said three common rotor shafts, which are aligned parallel to said acceleration path, are located symmetrically about said accelerator tube.

12. A d.c. charged particle accelerator as claimed in claim 10, further comprising a gas proof containment vessel having upstream and downstream ends;
    wherein said accelerator tube is vacuum-tight, extends in said containment vessel between said upstream and downstream ends so that charged particles are accelerated towards said downstream end, and has a vacuum seal connection through said downstream end to pass accelerated particles from said containments vessel; and
    wherein said regulated d.c. high voltage supply apparatus is housed in said containment vessel.

13. A d.c. charged particle accelerator as claimed in claim 12, wherein said containment vessel contains an electrically insulating gas.

14. A d.c. charged particle accelerator as claimed in claim 13, wherein said electrically insulating gas is sulfur hexafluoride (SF6) gas.

15. High Voltage power supply apparatus comprising:

at least two alternators having respective outputs to produce a.c. power at said outputs, each said alternator comprising a respective stator having at least one stator winding and a respective rotor carrying at least one rotor magnet to produce a rotary magnetic field in said stator to induce alternating currents in said stator winding to provide said a.c. power;

wherein said stators of said alternators are axially aligned; and wherein said high voltage power supply apparatus further comprises:

a common rotor shaft carrying, axially spaced along said shaft, said rotors of said alternators;

a stator tube carrying, axially spaced along said tube, said axially aligned stators, wherein said common rotor shaft is mounted for rotation within said stator tube and said stator tube provides electrical isolation of each of said stators carried by said stator tube;

a motor connected to rotate said common shaft so that each of said alternators generates said a.c. power at its respective output; and a respective d.c. high voltage power supply unit connected to receive said a.c. power from the output of each said alternator, each said d.c. high voltage power supply having a respective pair of output terminals and being operative to convert said a.c. power to produce a regulated d.c. high voltage output voltage at said respective pair of output terminals.

16. High Voltage power supply apparatus as claimed in claim 15, wherein said respective power supply units are electrically isolated from each other.

17. High Voltage power supply apparatus as claimed in claim 16, wherein said output terminals of said power supply units are connected in series.

18. A method of accelerating charged particles using d.c. voltages, comprising the steps of:

providing accelerator electrodes including end electrodes and at least N-1 intermediate electrodes, said accelerator electrodes defining at least N acceleration gaps between adjacent pairs of said electrodes, where N is at least three;

producing N regulated high voltage d.c. output voltages which are electrically isolated from each other;

wherein said N regulated high voltage d.c. output voltages are produced by driving N electrically isolated alternators to produce N a.c. power sources and converting a.c. power from each of said N a.c. power sources to provide a respective said regulated high voltage d.c. output voltage; and applying said N regulated output voltages to said accelerator electrodes defining said N acceleration gaps to provide gap voltages across said N acceleration gaps.

19. A method of accelerating charged particles using d.c. voltages as claimed in claim 18, wherein stators of at least two of said N alternators are axially aligned and rotors of said alternators with axially aligned stators are driven by a common drive shaft.

* * * * *